US011414315B2

(12) United States Patent
Driskell et al.

(10) Patent No.: US 11,414,315 B2
(45) Date of Patent: *Aug. 16, 2022

(54) DISPENSING SYSTEM INCLUDING A DISPENSING TAP AND AN INTEGRATED MEASURING CAP/CUP

(71) Applicant: Silgan Dispensing Systems Corporation, Grandview, MO (US)

(72) Inventors: William L. Driskell, Grandview, MO (US); Leah Smalley, Grandview, MO (US); Robert Good, Grandview, MO (US); Brian Van Houton, Grandview, MO (US); Linn Wanbaugh, Grandview, MO (US); Thanhhung Le, Grandview, MO (US); Daniel Choi, Grandview, MO (US); Joseph Dodd, Grandview, MO (US); Zachary Tyler, Grandview, MO (US); Bryan Fields, Grandview, MO (US); Brandon Ramsuer, Grandview, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 294 days.

This patent is subject to a terminal disclaimer.

(21) Appl. No.: 16/583,600

(22) Filed: Sep. 26, 2019

(65) Prior Publication Data

US 2020/0102124 A1     Apr. 2, 2020

Related U.S. Application Data

(60) Provisional application No. 62/737,402, filed on Sep. 27, 2018.

(51) Int. Cl.
    *F16K 21/04*    (2006.01)
    *B67D 3/04*     (2006.01)
    (Continued)

(52) U.S. Cl.
    CPC ............. *B67D 3/043* (2013.01); *B65D 41/04* (2013.01); *B65D 41/26* (2013.01); *B65D 47/12* (2013.01);
    (Continued)

(58) Field of Classification Search
    CPC .. B65D 47/12; B65D 47/2025; B65D 47/248; B65D 41/04; B65D 41/26; B67D 3/04; B67D 3/043; F16K 21/04
    (Continued)

(56) References Cited

U.S. PATENT DOCUMENTS 3,917,097 A     11/1975  Uhlig
4,452,425 A *   6/1984   Lucking ................. F16K 21/04
                                                     220/724

(Continued)

*Primary Examiner* — Paul R Durand
*Assistant Examiner* — Michael J. Melaragno
(74) *Attorney, Agent, or Firm* — Barlow, Josephs & Holmes, Ltd.; Stephen J. Holmes

(57) ABSTRACT

A dispensing system includes a liquid dispensing tap and an associated or integrated measuring cap/cup. The dispensing tap and cap/cup are configured such that the cap/cup is assembled with the tap prior to installation onto a container, and stays assembled with the tap during installation onto the container at the filling line, and which can later be removed for use and then reattached to the tap or container after use by the consumer.

11 Claims, 23 Drawing Sheets

(51) Int. Cl.
*B65D 41/26* (2006.01)
*B65D 47/12* (2006.01)
*B65D 41/04* (2006.01)
*B65D 47/20* (2006.01)
*B65D 47/24* (2006.01)

(52) U.S. Cl.
CPC ....... *B65D 47/2025* (2013.01); *B65D 47/248* (2013.01); *B67D 3/04* (2013.01); *F16K 21/04* (2013.01)

(58) Field of Classification Search
USPC .......................................................... 222/518
See application file for complete search history.

(56) References Cited

U.S. PATENT DOCUMENTS

| | | | | |
|---|---|---|---|---|
| 4,471,807 A | * | 9/1984 | Lucking | B67D 3/043 |
| | | | | 137/614.12 |
| 4,475,566 A | * | 10/1984 | Haines | B67B 7/26 |
| | | | | 137/318 |
| 6,896,158 B2 | * | 5/2005 | Leray | B67D 3/043 |
| | | | | 222/145.1 |
| 8,602,387 B2 | * | 12/2013 | Wrigley | B65D 47/283 |
| | | | | 251/339 |
| 10,526,191 B1 | * | 1/2020 | Driskell | B67D 3/043 |
| 10,807,769 B2 | * | 10/2020 | Ramsuer | B65D 25/42 |
| 10,889,485 B2 | * | 1/2021 | Driskell | G01F 13/00 |
| 10,994,985 B2 | * | 5/2021 | Driskell | B67D 3/043 |
| 2006/0138180 A1 | * | 6/2006 | Giblin | B65D 41/26 |
| | | | | 222/570 |
| 2008/0217286 A1 | | 9/2008 | Roberts et al. | |
| 2008/0237273 A1 | * | 10/2008 | Smith | B67D 3/045 |
| | | | | 222/509 |
| 2008/0237274 A1 | * | 10/2008 | Lester | B67D 3/045 |
| | | | | 222/518 |
| 2008/0237275 A1 | * | 10/2008 | Lester | B67D 3/043 |
| | | | | 222/518 |
| 2008/0237276 A1 | * | 10/2008 | Lester | B67D 3/043 |
| | | | | 222/518 |
| 2008/0245816 A1 | * | 10/2008 | Armstrong | B67D 3/043 |
| | | | | 222/81 |
| 2011/0017782 A1 | * | 1/2011 | Nini | B67D 3/044 |
| | | | | 222/518 |
| 2015/0284150 A1 | | 10/2015 | Doubles et al. | |
| 2019/0031401 A1 | * | 1/2019 | Ramsuer | D06F 39/022 |
| 2020/0102124 A1 | * | 4/2020 | Driskell | B65D 25/42 |
| 2020/0102199 A1 | * | 4/2020 | Driskell | F16K 24/02 |
| 2020/0115214 A1 | * | 4/2020 | Driskell | B67D 3/0029 |
| 2020/0399112 A1 | * | 12/2020 | Driskell | B65D 77/067 |
| 2021/0031982 A1 | * | 2/2021 | Ramsuer | B65D 25/38 |

\* cited by examiner

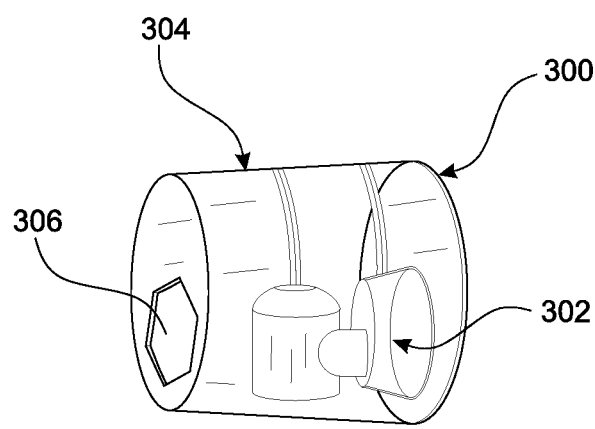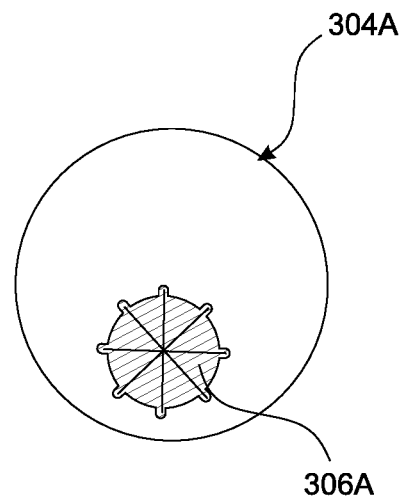
Fig. 17         Fig. 18
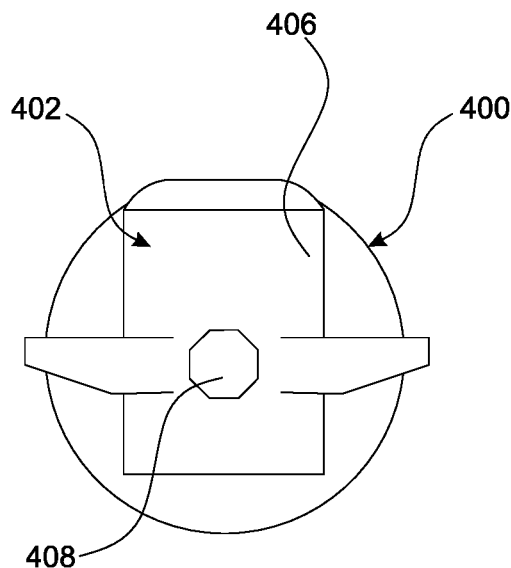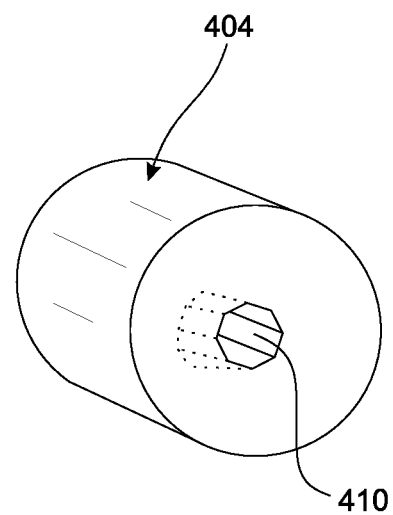
Fig. 19         Fig. 20

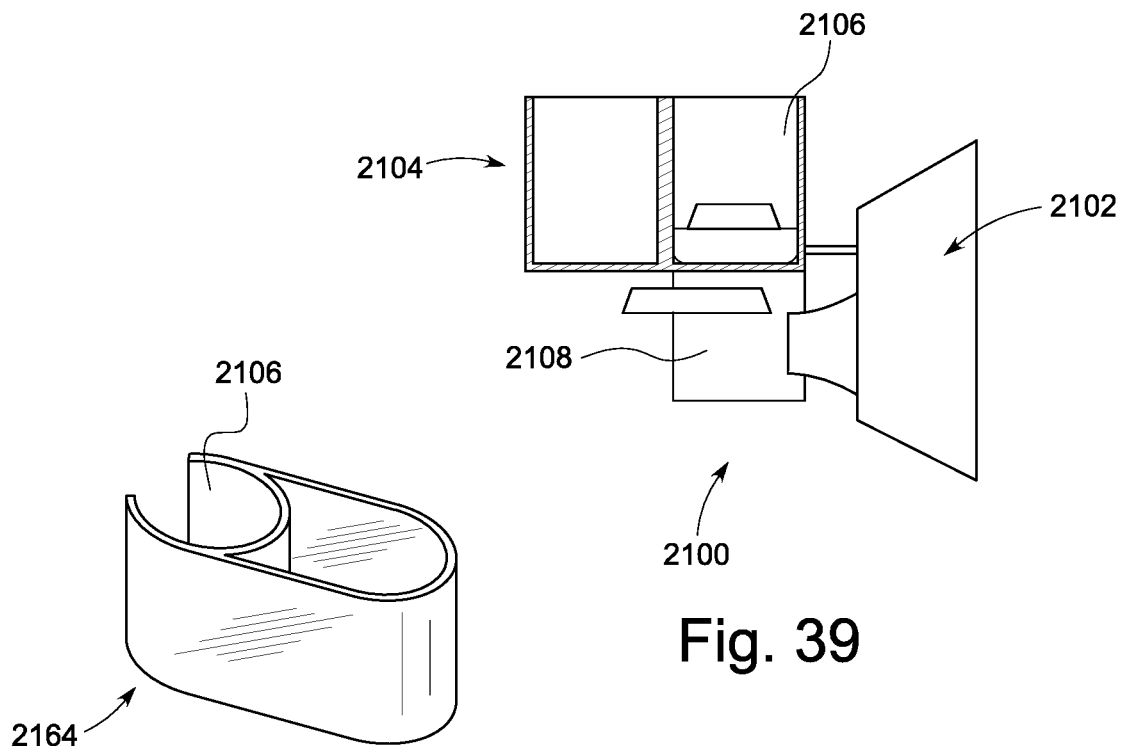
Fig. 39
Fig. 40
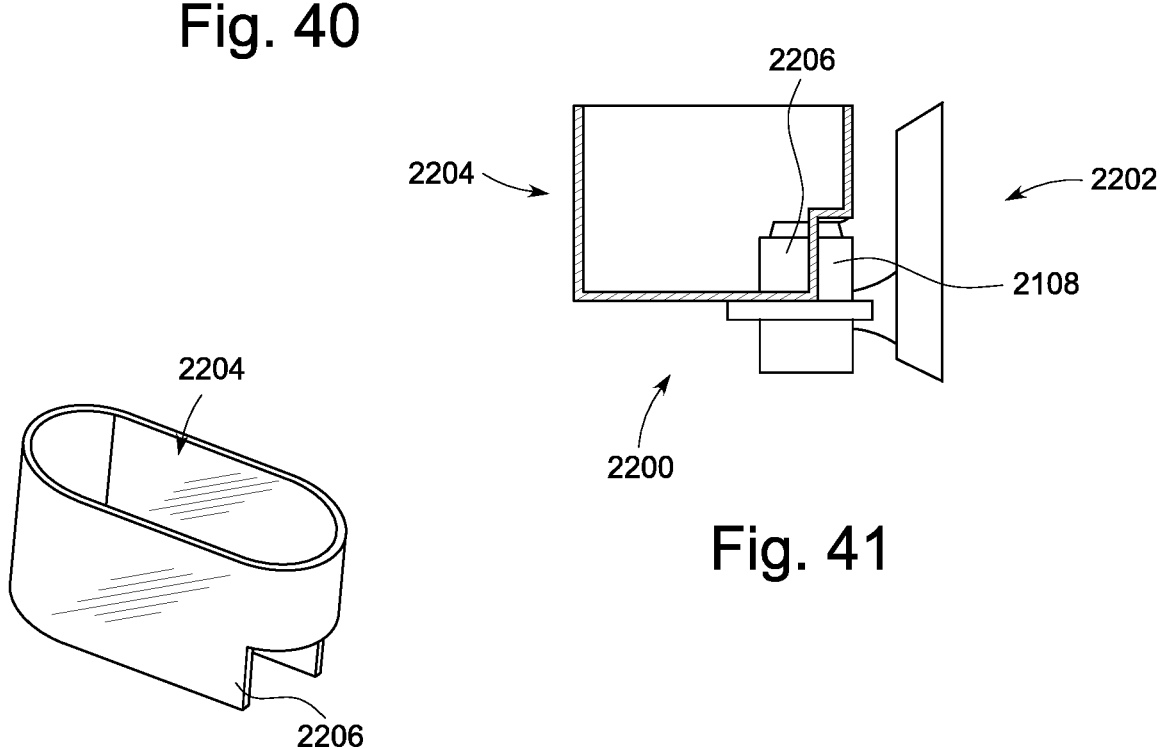
Fig. 41
Fig. 42

DISPENSING SYSTEM INCLUDING A DISPENSING TAP AND AN INTEGRATED MEASURING CAP/CUP

CROSS-REFERENCE TO RELATED APPLICATIONS

This application is a non-provisional of, and claims the benefit of U.S. Provisional Application No. 62/737,402, filed Sep. 27, 2018, the entire contents of which is incorporated herein by reference.

BACKGROUND OF THE DISCLOSURE

Embodiments of the invention relate to dispensing devices for flowable products such as liquid laundry detergent, and more particularly to a dispensing assembly including a liquid dispensing tap and an associated measuring cup which is assembled with the tap prior to installation onto a container, which stays assembled with the tap during installation onto the container at the filling line, and which can be removed and then selectively reattached to the tap or container after an initial use by the consumer.

Manufacturers and consumers continually drive the need for novel dispensing devices which provide easier assembly, more functionality and better dispensing options for a variety of products.

SUMMARY OF THE INVENTION

In order to simplify the process of filling liquid containers and assembling a tap and measuring cup/cap to the container on the filling line, the present disclosure provides for a combined dispensing tap and measuring cup which surrounds the tap, thus functioning as a cap, wherein the measuring cup/cap is pre-assembled with the tap such that the combined tap/cap assembly can be installed onto the container in a single step. The present disclosure is thus directed to a dispensing assembly comprising a combined dispensing tap and measuring cap/cup which is assembled with the tap prior to installation onto a container, which stays assembled with the tap during installation onto the container at the filling line, and which can be removed and then selectively reattached to the tap or container after an initial use by the consumer.

An exemplary embodiment of the invention is in the form of a liquid laundry detergent dispensing system. Exemplary embodiments of the container include an outward neck or an inward opening for connection of the tap. In some embodiments, the container neck is outwardly threaded or provided with a bayonet connection where the tap structure can be threaded or rotated into place.

The dispensing tap generally includes a body having a threaded neck or skirt structure which is configured to be torqued (screwed) onto a corresponding threaded neck or into an opening on the liquid container. The tap further includes a dispensing head connected to the body by a throat. A fluid passage extends through the body, throat and dispensing head to provide a delivery path from the container to a mouth of the dispensing head. A valve assembly is guided within the dispensing head and controlled by a depressible valve actuator for selective dispensing of the liquid from the container. In some embodiments, the tap includes finger holds to facilitate depression of the valve actuator.

The measuring cup/cap generally comprises a cup shaped structure having a bottom wall, sidewalls and an open top. In most embodiments, the open top of the measuring cup/cap is received over the dispensing tap to enclose or surround the tap within the interior of the cup wherein both the tap and cup/cap are provided with interfitting structures which hold the cup/cap to the tap during installation onto the container and then selectively retain the cup/cap on the tap after customer initial use. Additionally, the combined tap and cup structure, when assembled must also provide a structure or surface which has a sufficient gripping area to torque, i.e. grab and rotate the combined assembly onto the container.

In some embodiments, the interior walls of the cup include ribs and/or walls which engage and/or are snap received onto the dispensing head, onto a feature of the dispensing head or onto the finger holds extending from the tap or dispensing head.

In some embodiments, the finger hold(s) may include an additional mating structure, such as a bump, ridge or shoulder cutout which interfits with mating structures within the interior of the cup/cap.

In some exemplary embodiments, the tap body includes an enlarged skirt, and the cup includes a tamper evident strip on the cup lip which is snap received over the tap skirt. Snap structures may be varied in shape and number for the shape of the tap body.

The tap body may be circular or may be any other irregular shape to provide gripping surfaces for rotation.

In other exemplary embodiments, the tap and cup include complementary structures which allow the cup to be hung from the tap beneath the mouth of the tap for both filling and longer-term storage to catch drips from the dispenser mouth.

These above-described embodiments are generally gripped for assembly on the outer surface of the cup and the cup in turn grips the tap. The cup may have a cylindrical shape or may have an irregular shape which better conforms to the exterior shape of the tap and may provide an irregular external gripping surface for rotation of the assembly. The external surface of the cup may also include texturing or other raised or embossed surface features to provide additional engagement and surface area for higher torque during assembly.

In some embodiments the exterior of the cup includes a shaped recess or protrusion (hex, slot, key, etc.) for receiving a torquing tool for assembly with the container.

In some embodiments, the body of the tap includes raised ring walls which extend forwardly and provide a recess into which the upper lip of the cup is received and engaged.

In some embodiments, the cup may be threaded onto the body of the tap, i.e. either onto an outer surface of the tap body or within a raised ring structure extending from the body.

In some embodiments, the cap and tap body may include complementary bayonet structures for assembly.

In some embodiments, the tap body has radially extending fingers which engage with features on the lip of the cup.

In some embodiments, the tap body may include a non-circular raised snap structure which is snap fit with a like shaped cup. The non-circular shape provides surfaces for rotation and torquing.

In some cases, the cup may be hung from the tap or include other mating features which allow the cup to be snap received onto the tap structure for storage after the initial use.

In some embodiments, the cup may be snap received onto the valve head adjacent the dispensing mouth or into a recess on the dispensing head such that the cup is retained beneath the dispensing head to collect drips during storage.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 17 illustrates an embodiment where the cup includes a hex shaped opening for receipt of a torquing tool;

FIG. 18 illustrated another similar embodiment wherein the opening is a custom non-circular shape;

FIGS. 19-20 illustrate an exemplary embodiment where the front of the dispensing head including a hexagonal opening and the interior of the cup including a complementary hexagonal protrusion;

FIGS. 39-40 illustrate an embodiment where the cup includes a semi-circular ring which is snap received around the dispensing head for cup storage by the consumer after purchase;

FIGS. 41-42 illustrate another embodiment where the cup includes a semi-circular ring on the bottom of the cup which is snap received around the dispensing head for cup storage by the consumer after purchase;

DETAILED DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Figure 1:
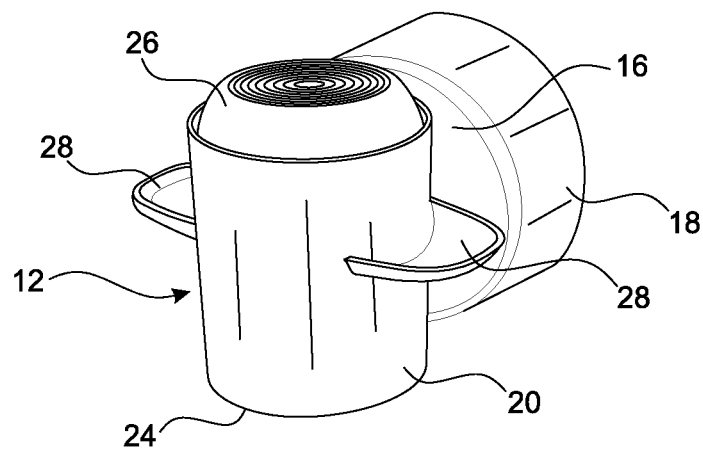
FIG. 1 is a perspective view of an exemplary liquid container and dispensing tap.
Figure 2:
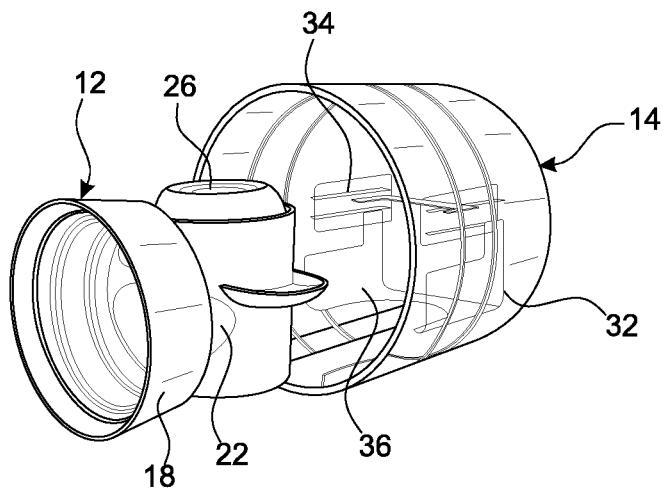
FIGS. 2-7 illustrate various exemplary embodiments where the cup includes internal structures for grasping the dispensing head or finger holds.
Figure 3:
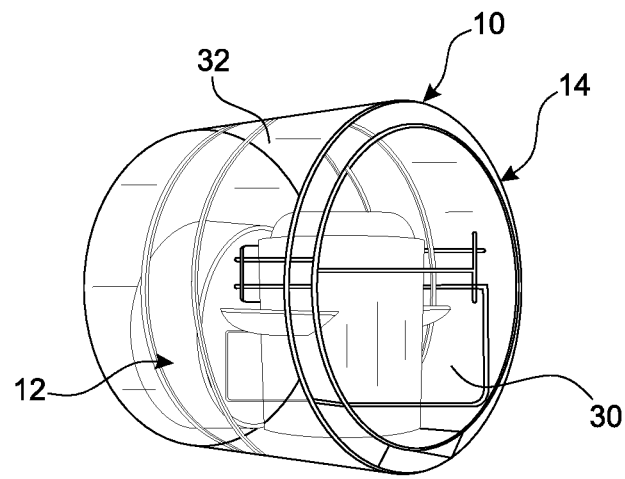

Referring to FIGS. 1-3, the present disclosure is generally directed to a novel dispensing assembly 10 comprising a dispensing tap 12 and measuring cap/cup 14 which is assembled with the tap 12 prior to installation onto a container C, and which stays assembled with the tap 12 during installation onto the container C at the filling line, and which can be removed and then reattached to the tap 12 or container after an initial use by the consumer.

An exemplary embodiment of the invention is in the form of a liquid laundry detergent dispensing system. Referring to FIG. 1, an exemplary embodiment of the container C includes a neck N or opening O (See FIG. 26) for connection of the tap 12. In some embodiments, the container neck N is threaded or provided with a bayonet connection where the tap structure 12 can be threaded or rotated into place.

The dispensing tap 12 may generally include a body 16 having a threaded neck (see FIG. 26) or skirt structure 18 which is configured to be torqued (screwed) onto a corresponding threaded neck N or into an opening O on the liquid container C. The tap/container connection may include any suitable connecting structure sufficient to form a suitable seal for the contained liquid and to provide orientation of the tap 12 relative to the container C. The tap 12 further includes a dispensing head 20 connected to the body 16 by a throat 22. A fluid passage extends through the body 16, throat 22 and dispensing head 20 to provide a delivery path from the container C to a mouth 24 of the dispensing head 20. A valve assembly (not shown) is guided within the dispensing head 20 and controlled by a depressible actuator 26 for selective dispensing of the liquid from the container C. In some embodiments, the tap 12 includes finger holds 28 to facilitate depression of the valve actuator 26.

A key issue is that the cup/cap 14 has to attach to the tap 12 at the assembly line where the tap 12 and cap 14 are made. The tap 12 would be assembled first and the cup/cap 14 would then be assembled onto the tap 12, and the combination boxed-up and sent to the customer, i.e. laundry detergent manufacturer. The customer would then fill their bottles/containers C and torque the tap/cup combination 12/14 onto the container C. The customers will want to have the cap/cup 14 stay on the tap 12 and not fall off during this process. As can be imagined, there may be significant force applied as the tap/cup combination 12/14 is being assembled with the filled bottle or container C.

The measuring cup/cap 14 generally comprises a cup shaped structure having a bottom wall 30, sidewalls 32 and an open top.

In most embodiments, the open top of the measuring cup/cap 14 is received over the dispensing tap 12 to enclose the tap 12 within the interior of the cup 14 and both the tap 12 and cup/cap 14 are provided with interfitting structures which hold the cup/cap 14 to the tap 12 during installation onto the container C and then selectively retain them together after initial customer use. Additionally, the combined tap and cup structure 12/14, when assembled, must also provide a structure or surface which has a sufficient gripping area to torque, i.e. grab and rotate the combined assembly 10 onto the container C.

FIGS. 1-13 illustrate various exemplary embodiments where the cup 14 includes internal structures for grasping the dispensing head 20, finger holds 28 or the skirt 18, or a combination thereof. The interior walls of the cup 14 may include snap ribs 34 and/or contoured projecting walls 36 which engage and/or are snap received onto the dispensing head 20, onto a feature of the dispensing head 20, onto the finger holds 28 extending from the tap 12 or dispensing head 20 or a combination of these structures.

Turning back to FIGS. 1-3 there is illustrated an exemplary embodiment wherein the bottom wall 30 and sidewalls 32 of the cup 14 include inwardly extending snap ribs 24 which engage with the finger holds 28 and contoured walls 34 which engage the dispensing head 20. The various snap ribs 32 and walls 34 cooperate to provide sufficient frictional engagement to retain the cup 14 on the tap 12 during shipment and provide sufficient surface engagement with withstand the torquing rotation of the cup 14 and tap 12 during installation on the container C.

Figure 4:
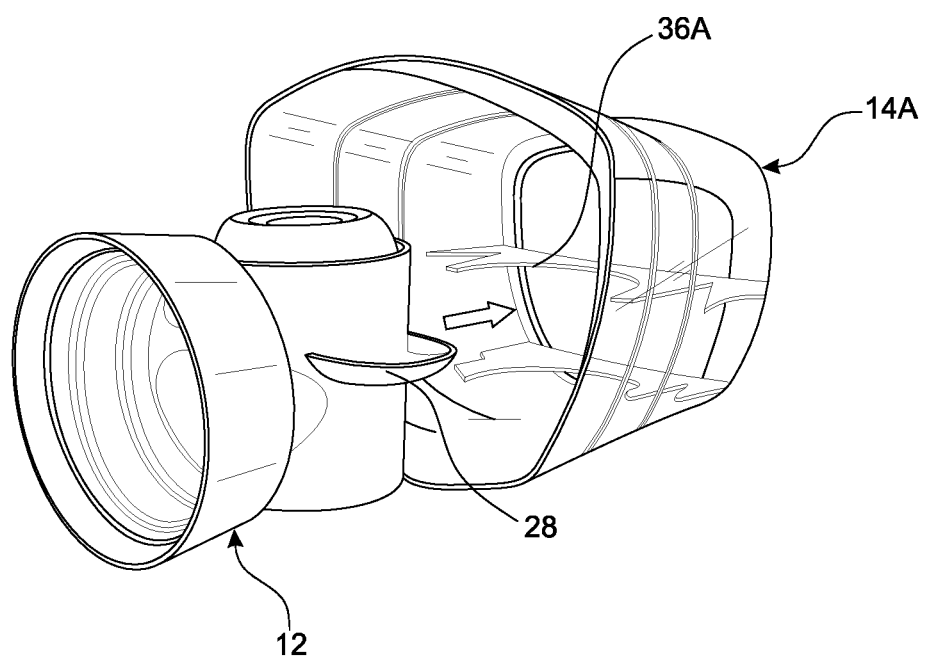
Figure 5:
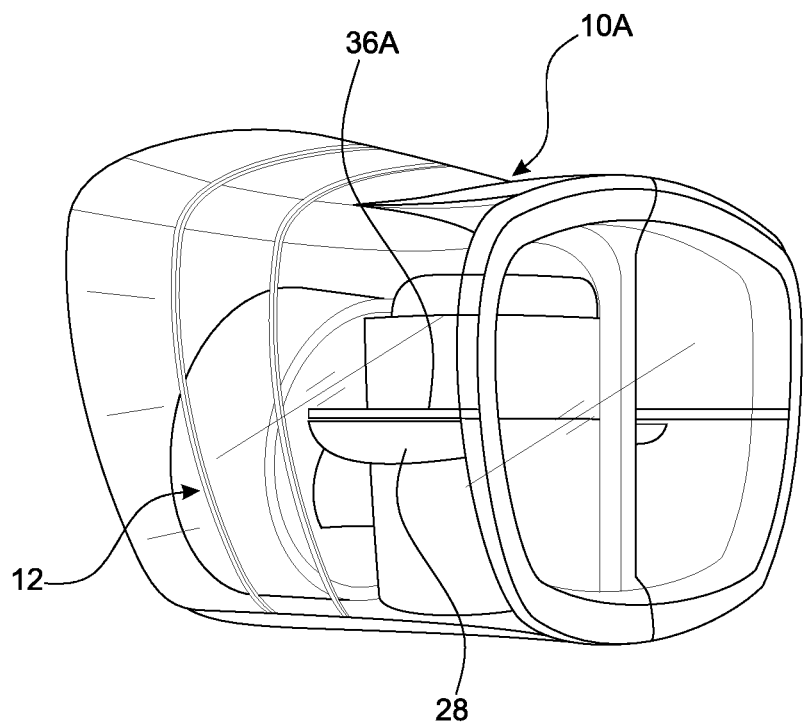

FIGS. 4-5 illustrates another embodiment 10A with an aesthetically contoured cup 14A and similar contoured walls 36A which engage above and below the finger holder 28.

Figure 6:
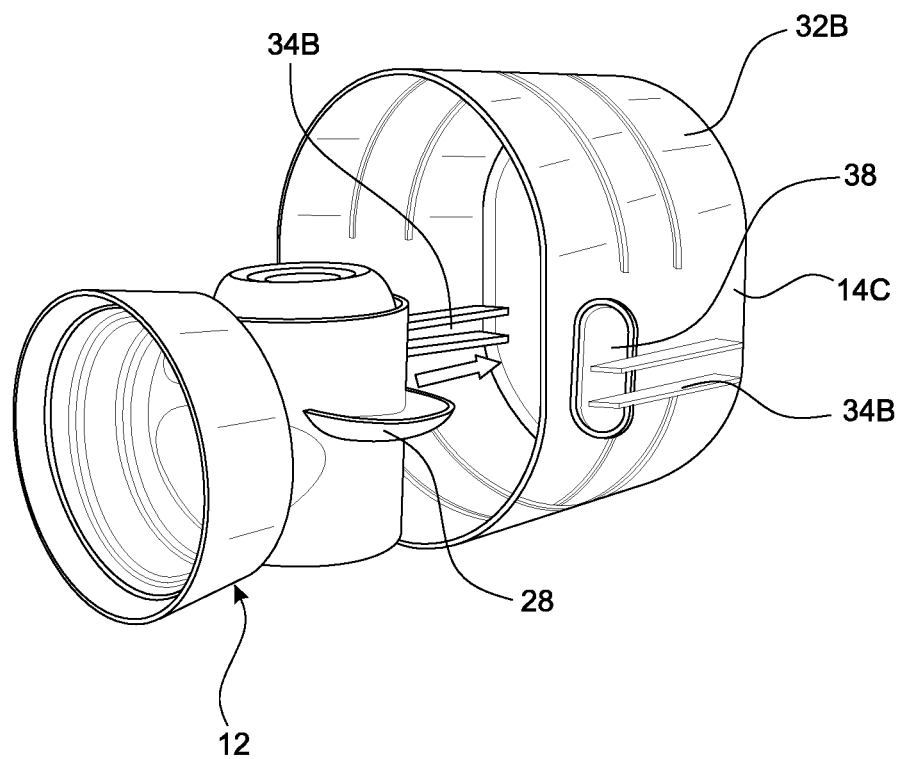
Figure 7:
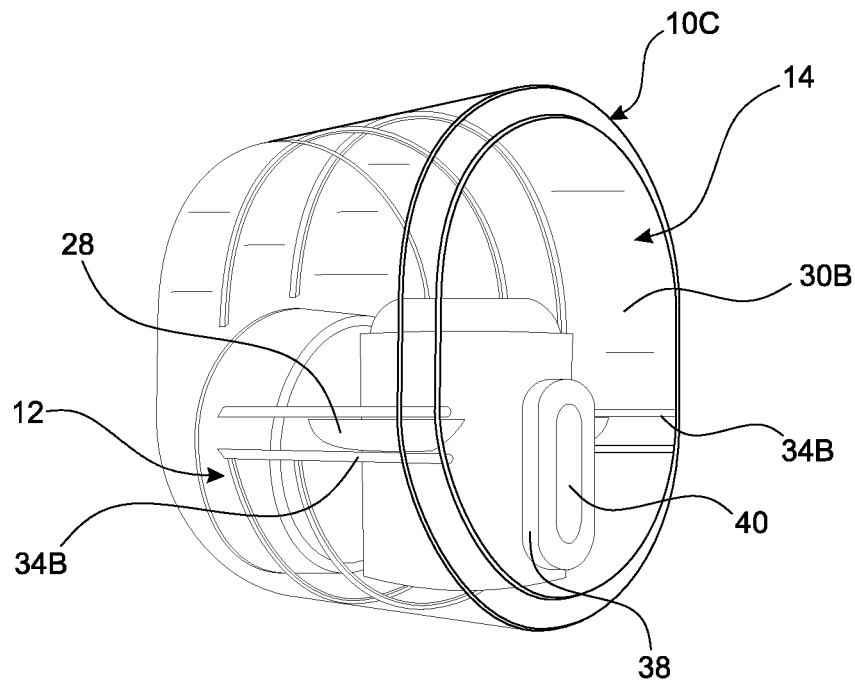

FIGS. 6-7 illustrate an exemplary embodiment 10B where the side walls 32B of the cup 14B include spaced snap ribs 34B which engage the finger holds 28 and the bottom wall 30B of the cup 14B includes an oval recess 38 which received a like-shaped oval shoulder 40 on the front of the dispensing head of the tap 12.

Figure 8:
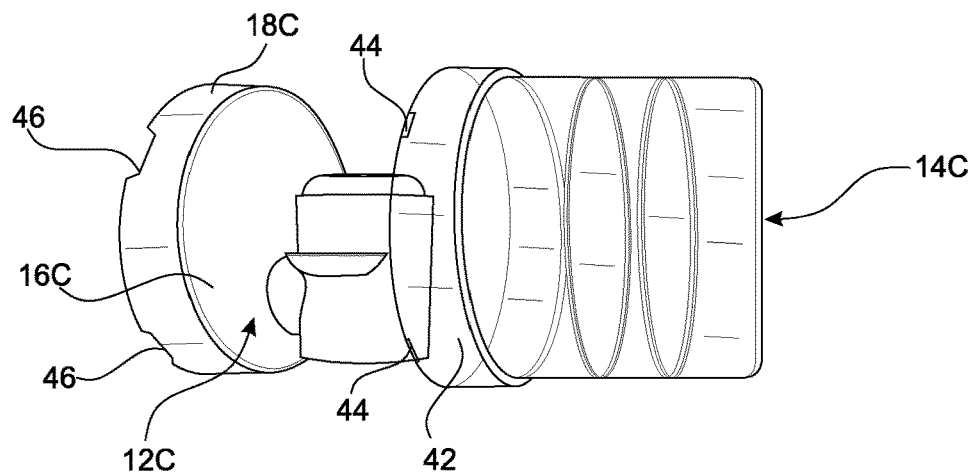
FIGS. 8-10 illustrate an exemplary embodiment where the cup includes a tamper evident strip and snap structure for engaging the skirt of the tap body.
Figure 9:
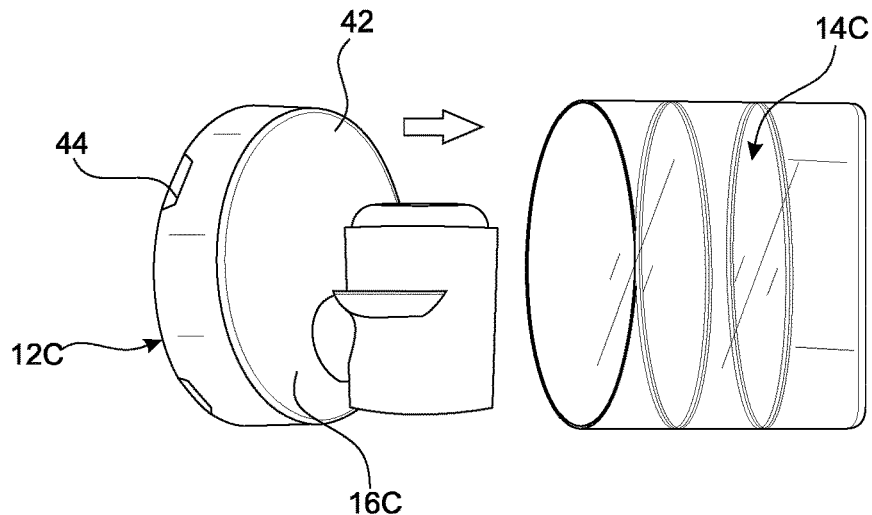
Figure 10:
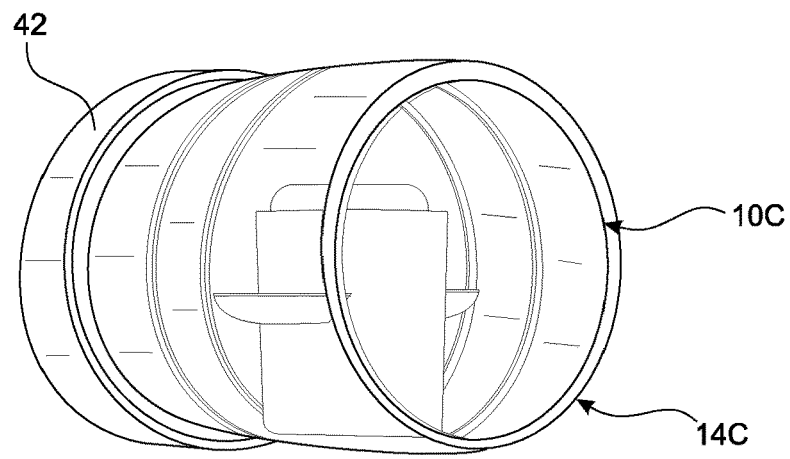

FIGS. 8-10 illustrate an exemplary embodiment 10C where the cup 14C includes a tamper evident strip 42 and snap structures 44 for engaging with like snap notches 46 on the peripheral edge of the skirt 18C of the tap body 16C. The snap structures 44 and notches 46 may be varied in shape and number for the particular shape of the tap skirt 18C.

The tap body 16 and skirt 18 of the various embodiments may be circular or may be any other irregular shape to provide gripping surfaces for rotation.

Figure 11:
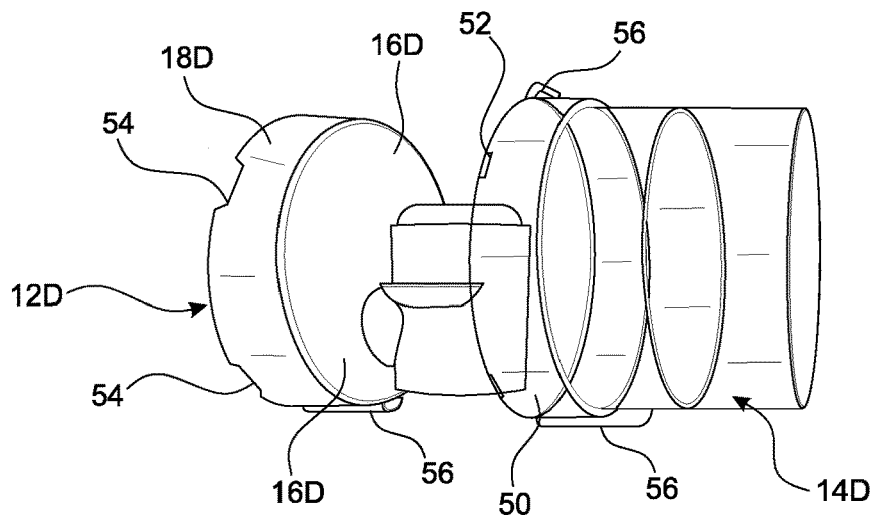
FIGS. 11-13 illustrate an exemplary embodiment where the cup includes snap structures for engaging the skirt of the tap body.
Figure 12:
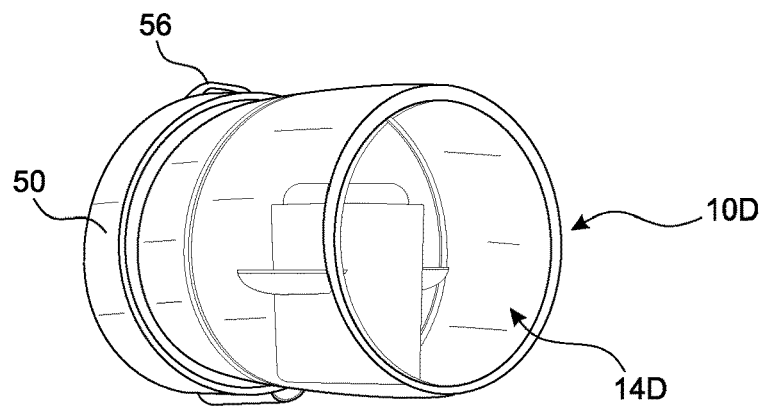
Figure 13:
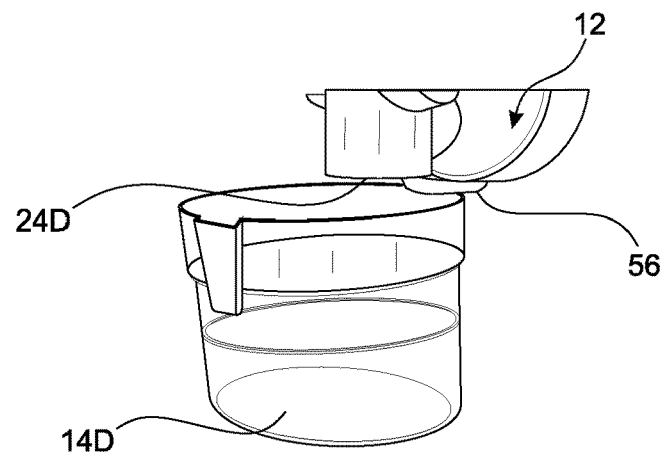
Figure 14A:
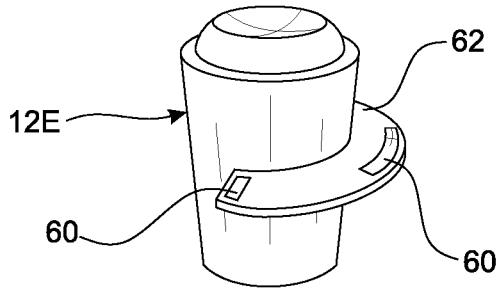
FIGS. 14A-H illustrate various embodiments of the tap including mating structures on a finger hold flange.
Figure 14B:
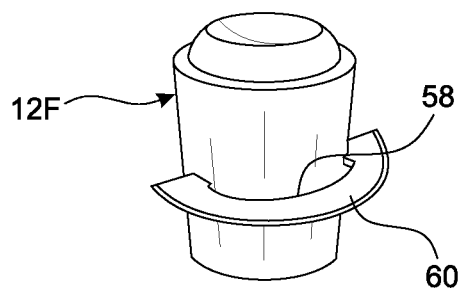
Figure 14C:
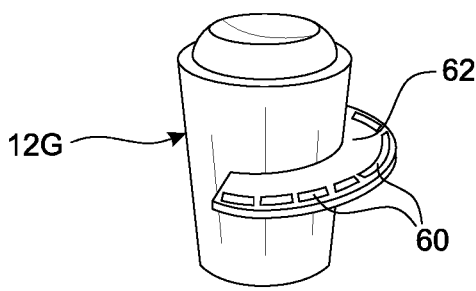
Figure 14D:
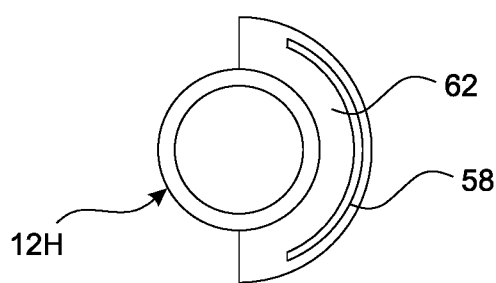
Figure 14E:
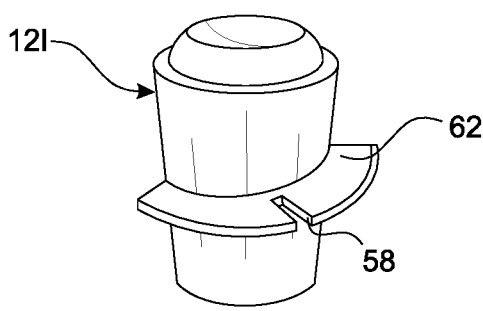
Figure 14F:
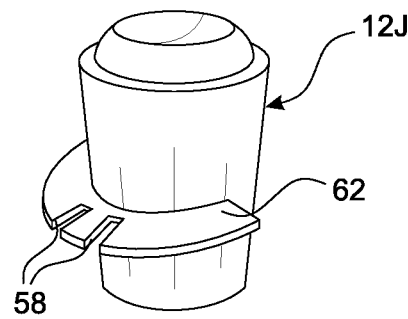
Figure 14G:
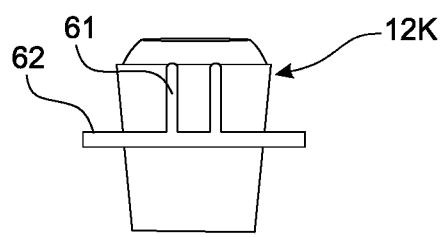
Figure 14H:
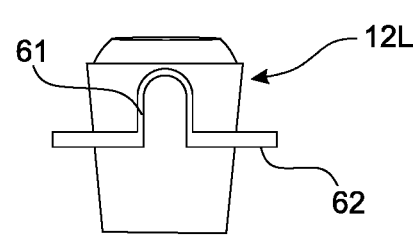

FIGS. 11-13 illustrate yet another exemplary embodiment 10D where the cup 14D includes an enlarged peripheral lip 50 and snap structures 52 for engaging like snap notches 54 on the peripheral edge of the skirt 18D of the tap body 16D. The tap 12D and cup 14D also include complementary structures, such as clips 56 which allow the cup 14D to be hung from tap skirt 18D beneath the mouth 24D of the tap 12D for both filling and longer-term storage to catch drips from the dispenser mouth 24D.

FIGS. 14A-14H illustrate various exemplary embodiments of a dispensing tap 12E-12L including various slot structures 58, bumps 60 or protrusions 61 in a radially extending finger flange 62 for engaging with mating structures on various complementary caps (not shown).

These above-described embodiments 10 are generally gripped for assembly with the container C on the outer surface of the cup 14, and the cup 14 in turn grips the tap 12. The cup 14 may have a cylindrical shape or may have an irregular shape which better conforms to the exterior shape of the tap 12 and may provide an irregular external gripping surface for rotation of the assembly 10. The external surface of the cup 14 may also include texturing or other raised or embossed surface features to provide additional engagement and surface area for higher torque during assembly (See also FIG. 44).

FIGS. 15-22 illustrate various exemplary embodiments where the cup includes external recesses or shapes which can be engaged by a torquing tool for assembly with the container.

Figure 15:
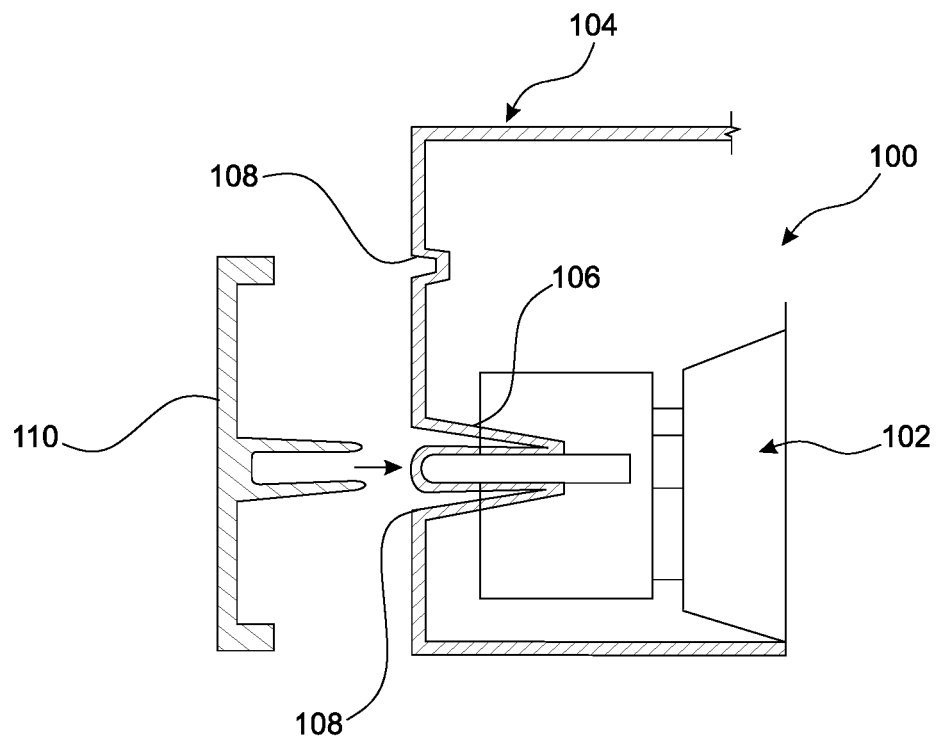
FIG. 15 illustrates an exemplary embodiment where the cup includes external recesses or shapes which can be engaged by a torquing tool for assembly with the container.

FIG. 15 illustrates an exemplary embodiment 100 including a tap 102 and cup 104 where the cup 104 includes internal ribs 106 which engage the tap 102 and external recesses 108 or shapes which can be engaged by a like-shaped torquing tool 110 for assembly with the container C.

Figure 16:
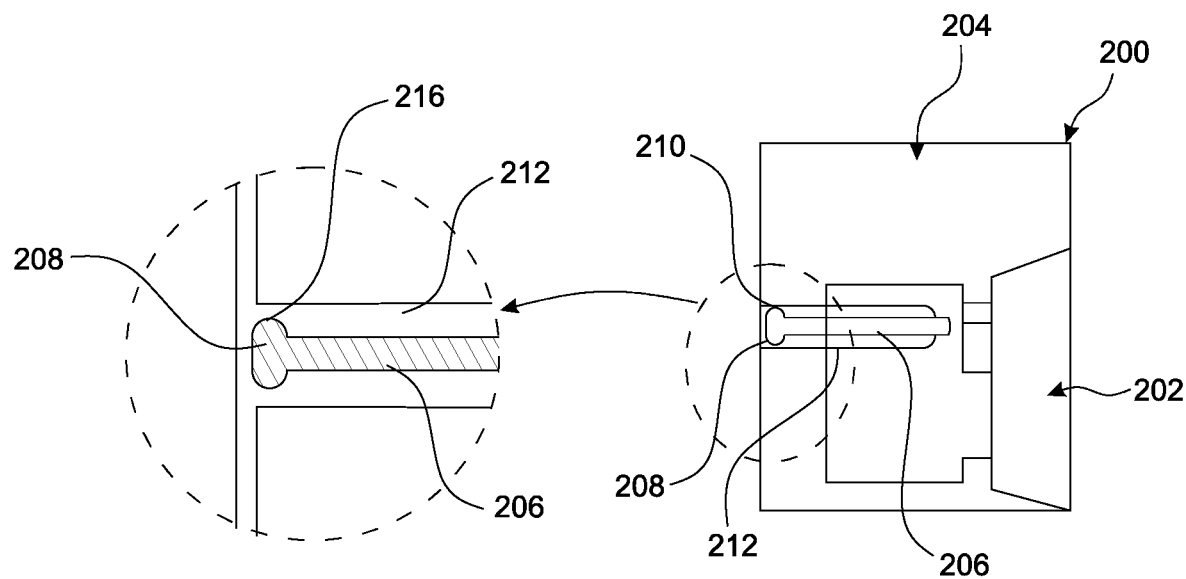
FIG. 16 illustrates an exemplary embodiment where the peripheral edge of the finger flange includes an enlarged edge structure for engaging a complementary slot on an internal structure of the cup.

FIG. 16 illustrates an exemplary embodiment 200 including a tap 202 and cup 204 where the peripheral edge of the finger flange 206 includes an enlarged bead structure 208 for engaging a complementary slot 210 on an internal wall structure 212 of the cup 204.

FIG. 17 illustrates an embodiment 300 including a tap 302 and cup 304 where the bottom wall of the cup 304 includes a hex shaped opening 306 for receipt of a torquing tool (not shown).

FIG. 18 illustrated another similar embodiment 300A wherein the opening 306A is a custom non-circular shape 306A.

FIGS. 19-20 illustrate an exemplary embodiment 400 including a tap 402 and cup 404 where the front of the dispensing head 406 includes a hexagonal opening 408 and the interior of the cup includes a complementary hexagonal protrusion 410.

Figure 21:
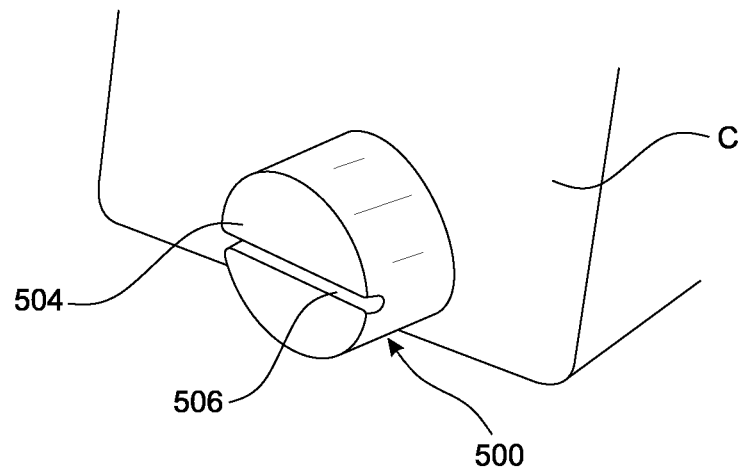
FIG. 21 illustrates an exemplary embodiment where the external surface of the cap includes an elongated slot.

FIG. 21 illustrates an exemplary embodiment 500 where the external surface of the cap 504 includes an elongated slot 506.

Figure 22:
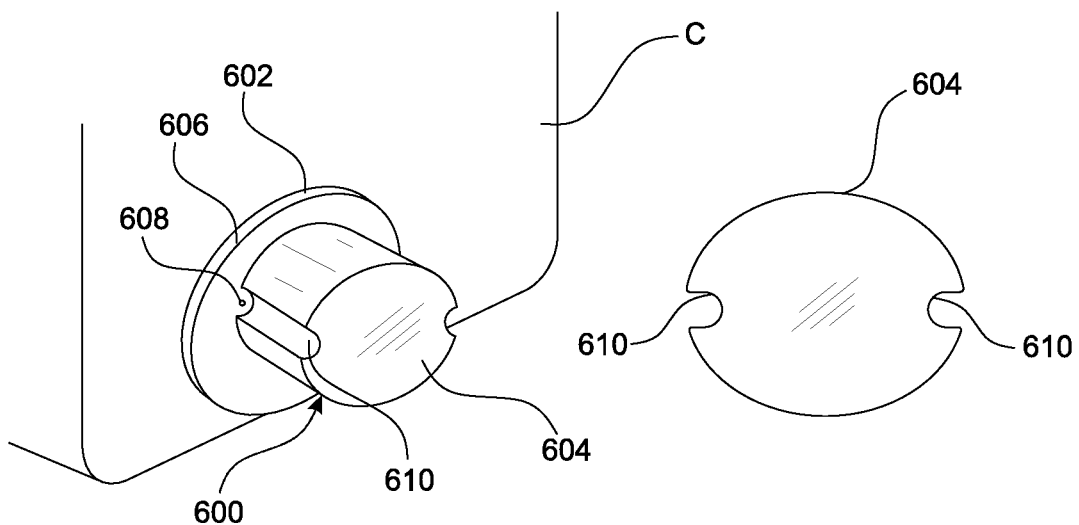
FIG. 22 illustrates an exemplary embodiment wherein the tap skirt includes opposing engagement structures for receiving a torquing tool and the cap includes external indentations to provide access to the engagement structures.

FIG. 22 illustrates an exemplary embodiment 600 including a tap 602 and a cap 604 wherein the tap skirt 606 includes opposing engagement structures 608 (such as holes) for receiving a torquing tool and the cap 604 includes external indentations 610 to provide access to the engagement structures 608.

FIGS. 23-35 illustrate various exemplary embodiments of structures for securing the cup to the tap skirt.

Figure 23:
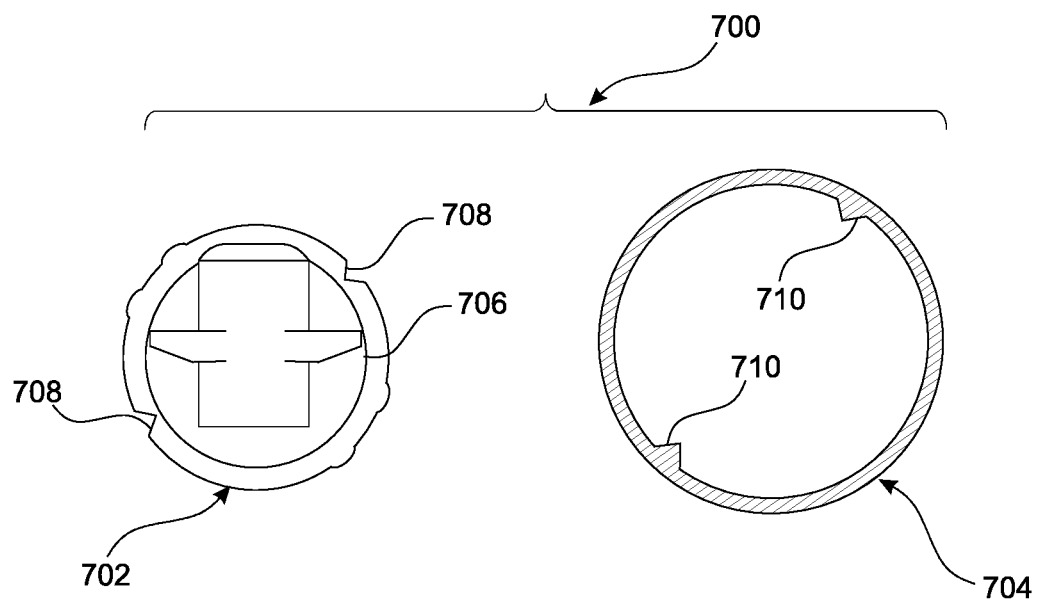
FIG. 23 illustrates an exemplary embodiment where the tap skirt includes radially inwardly extending notches and the interior peripheral edge of the cup includes complementary tabs.

FIG. 23 illustrates an exemplary embodiment 700 including a tap 702 and a cap 704 where the tap skirt 706 includes radially inwardly extending notches 708 and the interior peripheral edge of the cup 704 includes complementary tabs 710 which engage the notches for co-rotation.

Figure 24:
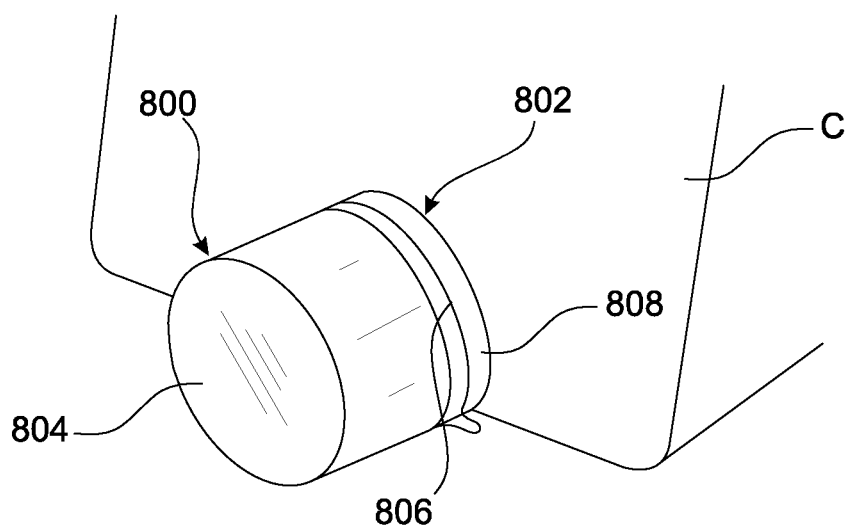
FIG. 24 illustrates an exemplary embodiment where the cap includes a tear strip for removal thereof.

FIG. 24 illustrates an exemplary embodiment 800 including a tap 802 and a cap 804 where the cap 804 includes a tear strip 806 which engages around the tap skirt 808 to retain the cap 804 and tap 802 in assembled relation.

Figure 25:
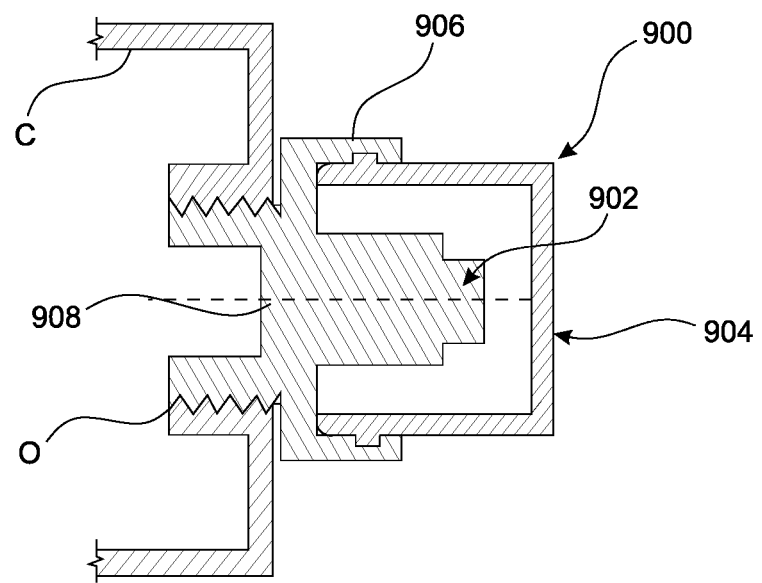
FIG. 25 illustrates an exemplary embodiment where the peripheral edge of the cap is snap received within an outward annular ring wall on the tap.

FIG. 25 illustrates an exemplary embodiment 900 including a tap 902 and cap 904 where the peripheral edge of the cap 902 is snap received within an outward annular ring wall 906 projecting forwardly from the tap body 908.

Figure 26:
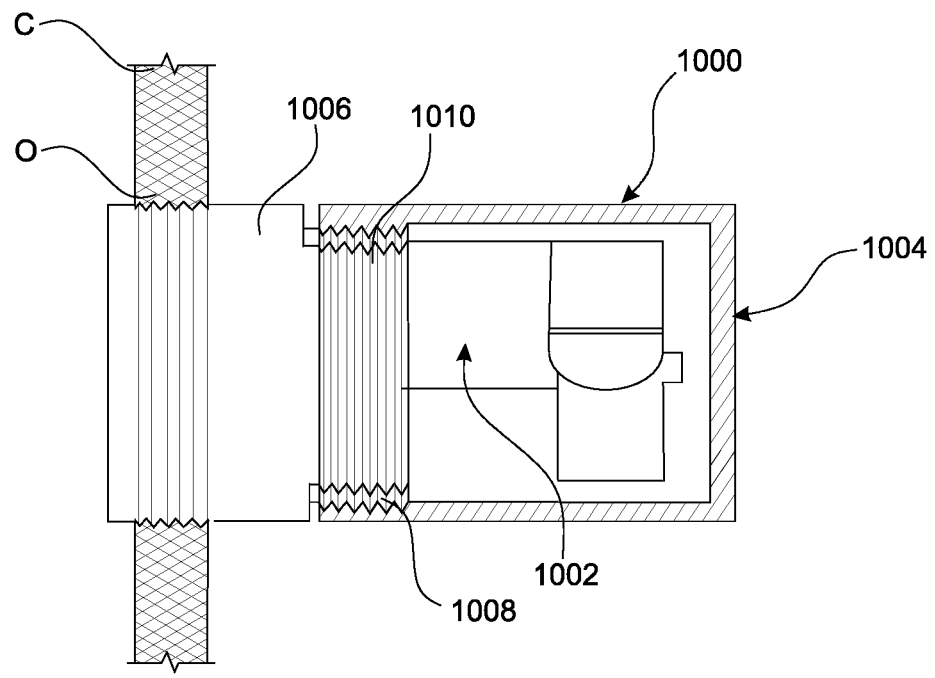
FIG. 26 illustrates an exemplary embodiment where an inwardly threaded cap is received on an outwardly threaded tap skirt.

FIG. 26 illustrates an exemplary embodiment 1000 including a tap 1002 and a cap 1004. In this embodiment 1000, the container C includes a threaded opening O and the tap 1002 includes an outwardly threaded neck 1006. The peripheral edge of the cap 1004 is inwardly threaded 1008 and is received on an outwardly threaded portion 1010 of the tap 1002.

Figure 27:
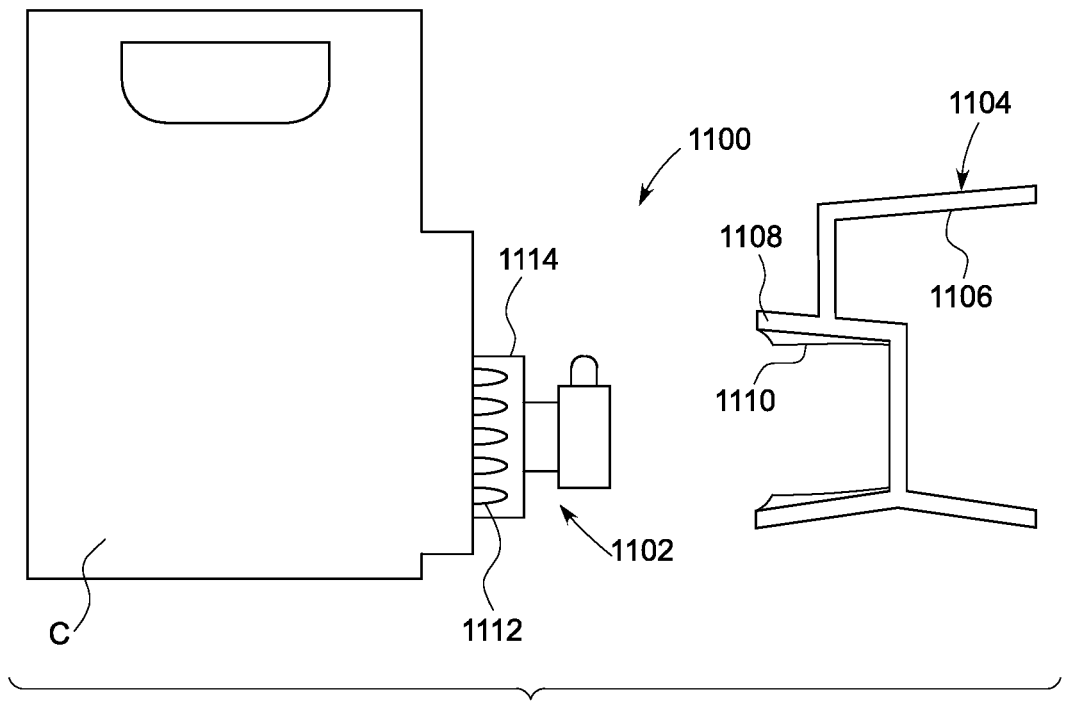
FIG. 27 illustrates an exemplary embodiment where the cap is two sided and one side includes structures which mate with the tap skirt.

FIG. 27 illustrates an exemplary embodiment 1100 including a tap 1102 and a cap 1104 where the cap 1004 is two sided. The outward side 1006 is the liquid fill side. The inward side includes an annular collar 1108 having inwardly extending structures 1110 which mate with corresponding notch structures 1112 on the tap skirt 1114.

Figure 28:
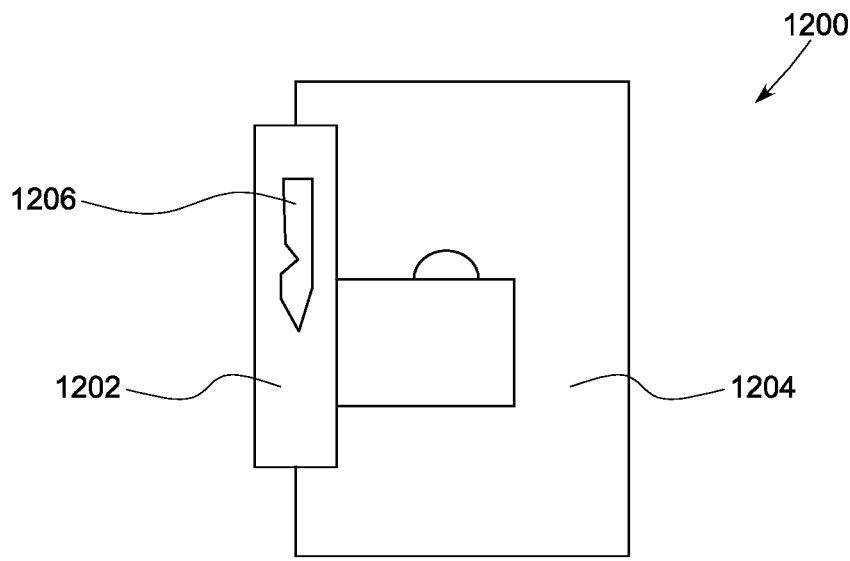
FIG. 28 illustrates an exemplary embodiment wherein the cap is secured to the tap skirt with a bayonet type rotating connection.

FIG. 28 illustrates an exemplary embodiment 1200 wherein the tap 1202 and the cap 1204 are secured together with a bayonet-type rotating connection 1206.

Figure 29:
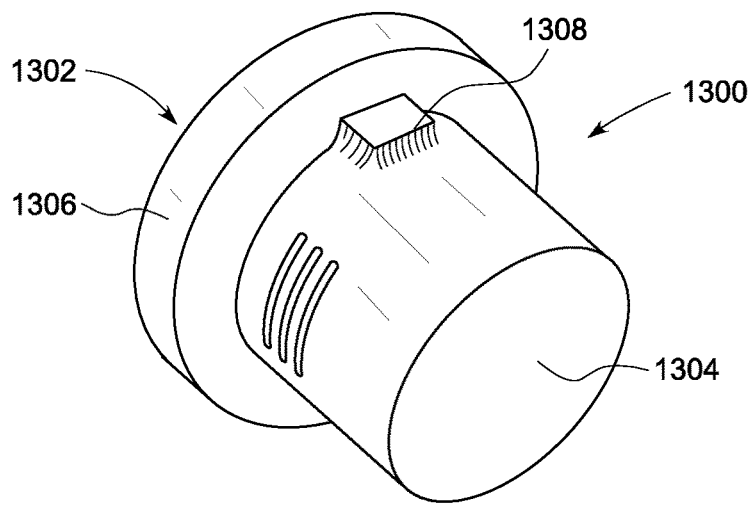
FIG. 29 illustrates an exemplary embodiment wherein the cap is snap received onto the skirt with opposing lugs and can be removed by squeezing the cap to dislodge the snap-fit connections.

FIG. 29 illustrates an exemplary embodiment 1300 including a tap 1302 and a cap 1304 wherein the cap 1304 is snap received onto the skirt 1306 with opposing snap-fit connection 1308 and can be removed by squeezing opposing sides of the cap 1304 to dislodge the snap-fit connections 1308.

Figure 30:
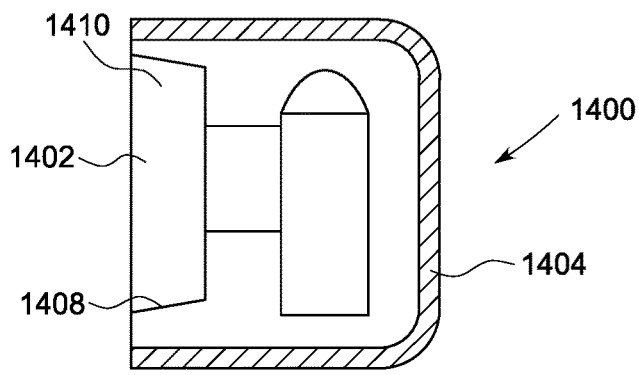
FIGS. 30-32 illustrate an embodiment wherein the cap has a D-shaped non-circular flange which interlocks with a complementary slot on the tap skirt.
Figure 31:
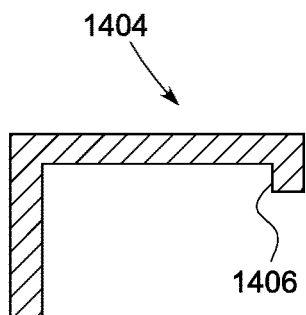
Figure 32:
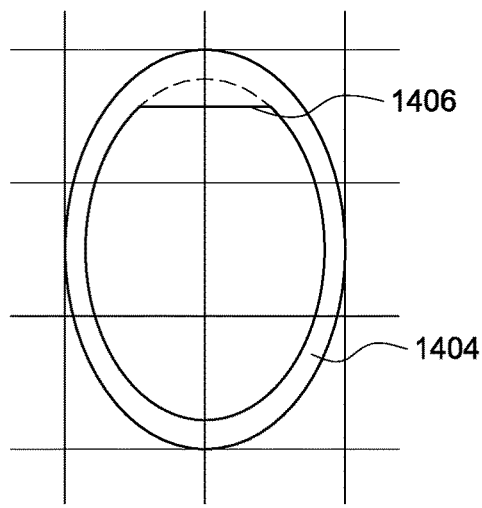

FIGS. 30-32 illustrate an embodiment 1400 including a tap 1402 and a cap 1404 wherein the cap 1404 has a D-shaped non-circular flange 1406 which interlocks with a complementary slot 1408 on the tap skirt 1410.

Figure 33:
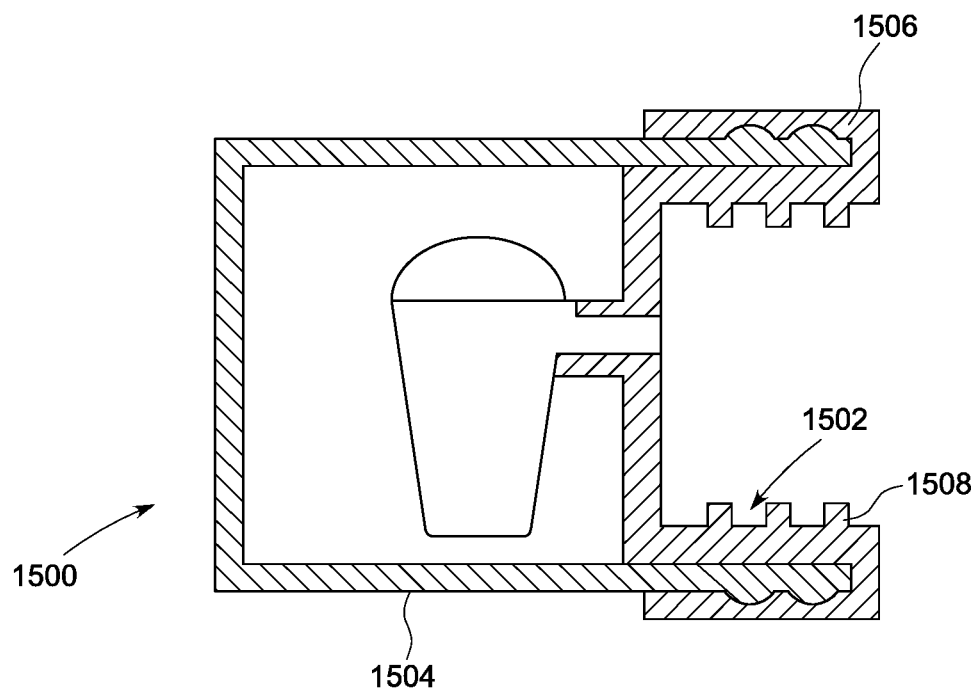
FIG. 33 illustrates another exemplary embodiment wherein the peripheral edge of the cup is snap received into an annular recess formed in the tap skirt.

FIG. 33 illustrates another exemplary embodiment 1500 including a tap 1502 and cap 1504 where the peripheral edge of the cap 1502 is snap received within an outward annular recess 1506 formed in the tap body 1508.

Figure 34:
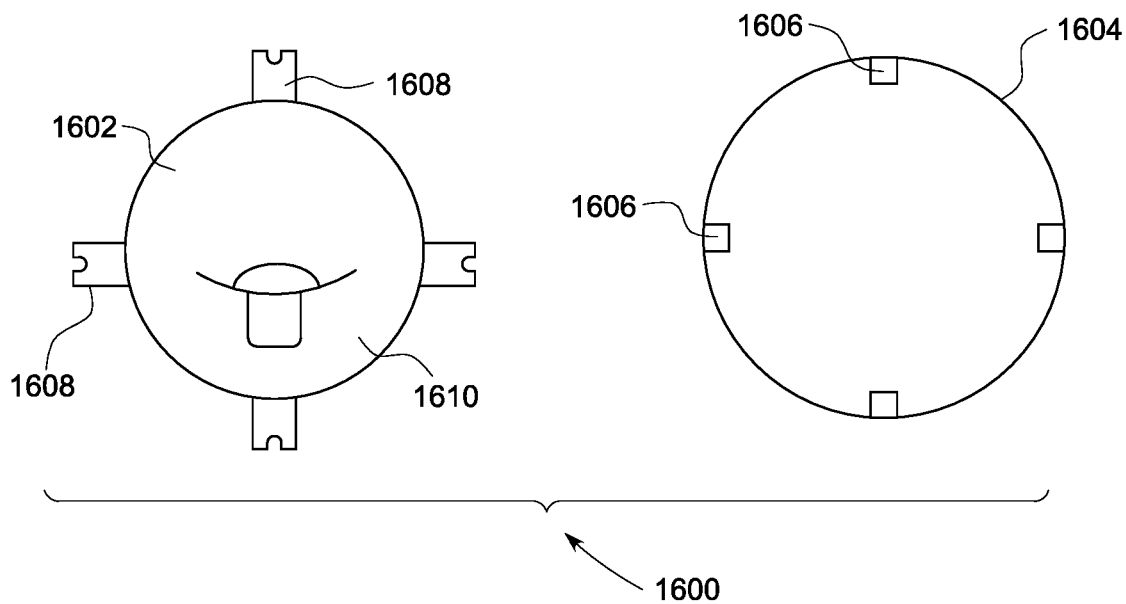
FIG. 34 illustrates an exemplary embodiment where the cup includes inward snap formations received onto arms radially protruding from the tap skirt.

FIG. 34 illustrates an exemplary embodiment 1600 including a tap 1602 and a cap/cup 1604 where the cup 1604 includes inward snap formations 1606 received onto arms 1608 radially protruding from the tap skirt 1610.

Figure 35:
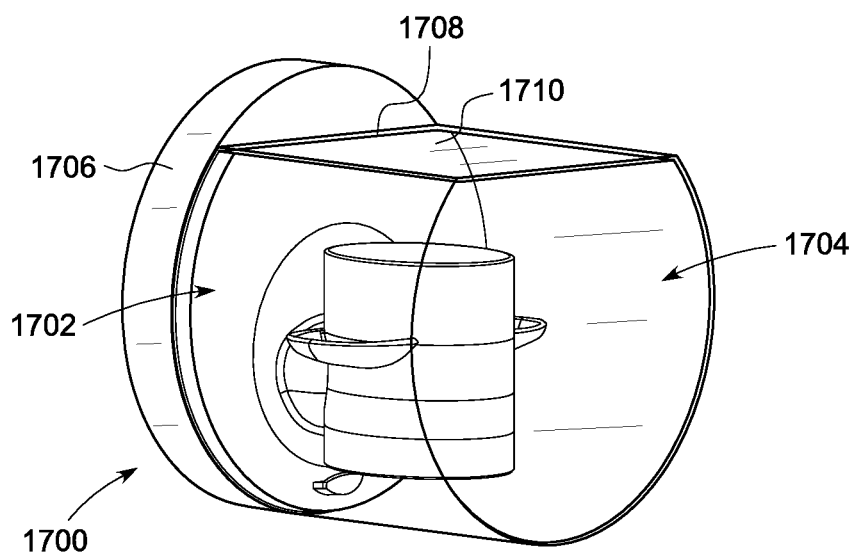
FIG. 35 illustrates an exemplary embodiment where the valve skirt has a raised D-shaped shoulder which interlocks with a like shaped peripheral edge of the cup.

FIG. 35 illustrates an exemplary embodiment 1700 including a tap 1702 and a cap/cup 1704 where the tap skirt 1706 has a raised D-shaped shoulder 1708 which interlocks with a like shaped peripheral edge 1710 of the cup 1704.

FIGS. 36-60 illustrate various exemplary embodiments which include interfitting structures for selectively retaining the cup with the tap after the initial consumer use.

Figure 36:
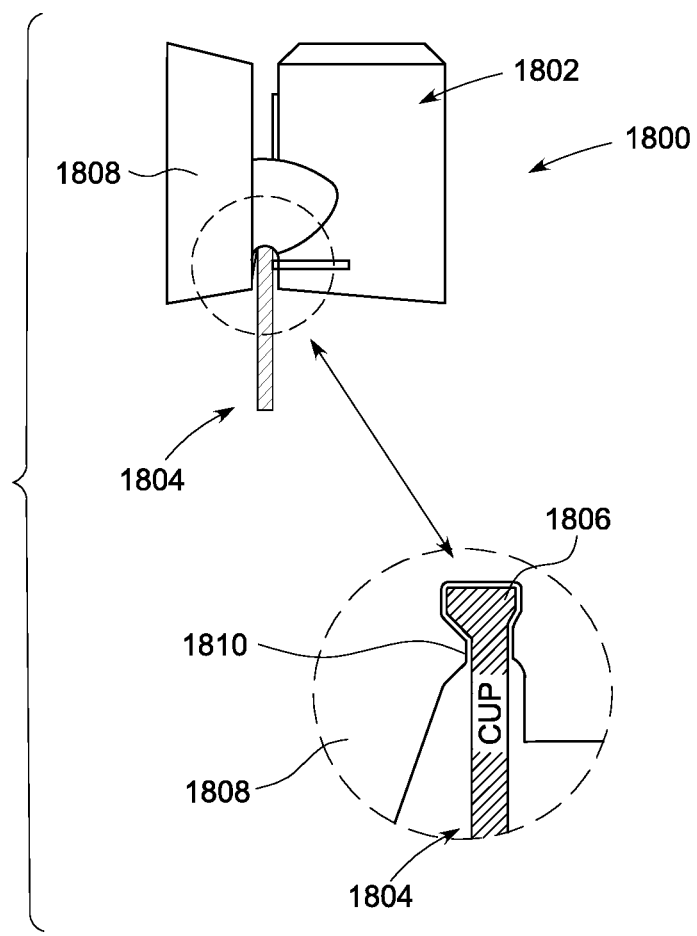
FIG. 36 illustrates an exemplary embodiment where the lip of the cap and the tap skirt have an interfitting spline and groove for cup storage by the consumer after purchase.

FIG. 36 illustrates an exemplary embodiment 1800 including a tap 1802 and a cap 1804 where the peripheral lip of the cap 1804 has a spline bead 1806 and the tap body 1808 has a complementary spline groove 1810 for cup storage by the consumer after purchase.

Figure 37:
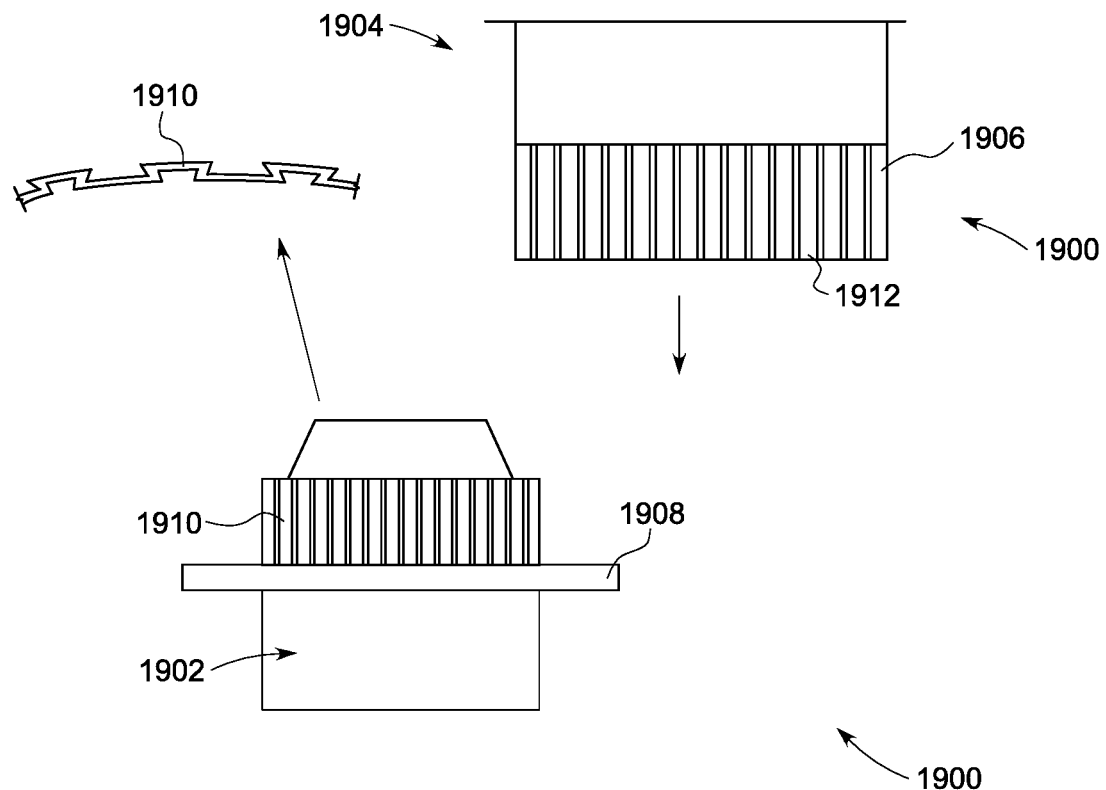
FIG. 37 illustrates an exemplary embodiment where the base of the cap and the finger hold flange of the tap have an interfitting dovetail structures for cup storage by the consumer after purchase.

FIG. 37 illustrates an exemplary embodiment 1900 including a tap 1902 and a cap/cup 1904 where the base 1906 of the cap 1904 and the finger hold flange 1908 of the tap 1902 have an interfitting dovetail structures 1910, 1912 for cup storage by the consumer after purchase.

Figure 38:
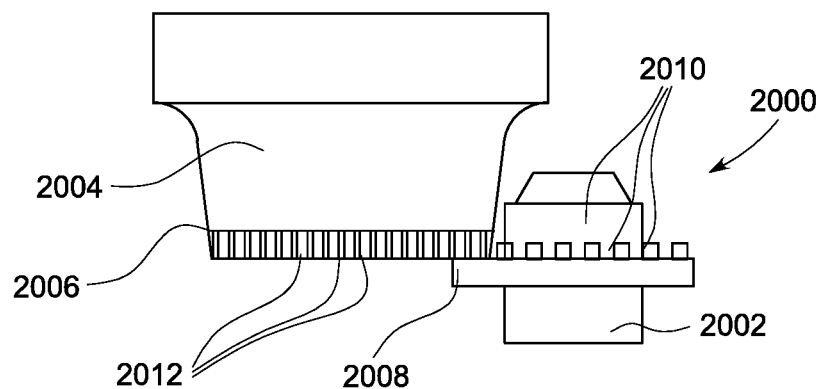
FIG. 38 illustrates an exemplary embodiment where the base of the cap and the finger hold flange of the tap have an interfitting post and hole structures for cup storage by the consumer after purchase.

FIG. 38 illustrates an exemplary embodiment 2000 including a tap 2002 and cap/cup 2004 where the base 2006 of the cap 2004 and the finger hold flange 2008 of the tap 2002 have an interfitting posts 2010 and holes 2012 for cup storage by the consumer after purchase.

FIGS. 39-40 illustrate an embodiment 2100 including a tap 2102 and a cap/cup 2104 where the cup 2104 includes a semi-circular ring 2106 on one end thereof which is snap received around the dispensing head 2108 for cup storage by the consumer after purchase.

FIGS. 41-42 illustrate another embodiment 2200 including a tap 2202 and a cap 2204 where the cup 2204 includes a semi-circular ring 2206 on the bottom portion of the cup 2204 which is snap received around the dispensing head 2208 for cup storage by the consumer after purchase.

Figure 43:
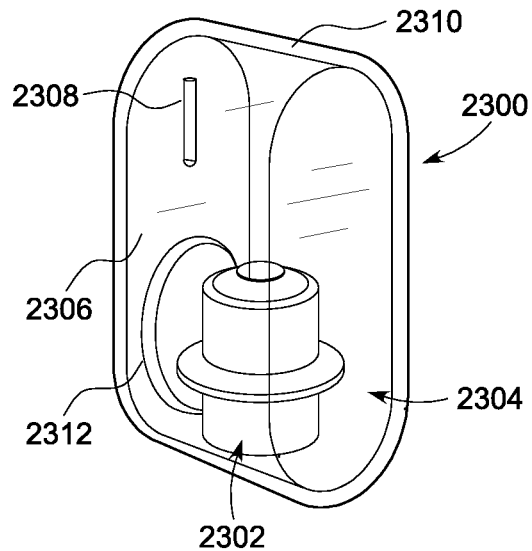
FIGS. 43-44 illustrate an exemplary embodiment where a side wall of the cup includes a linear spline which is slidably received into a complementary groove on the face of the tap skirt for cup storage by the consumer after purchase.
Figure 44:
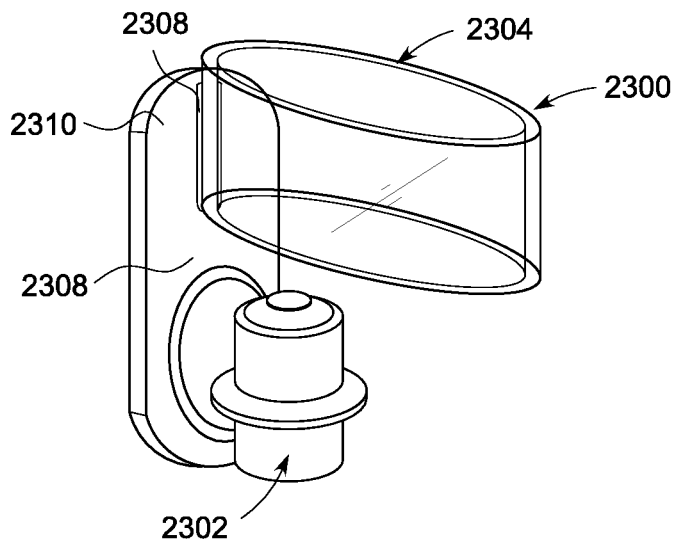
Figure 45:
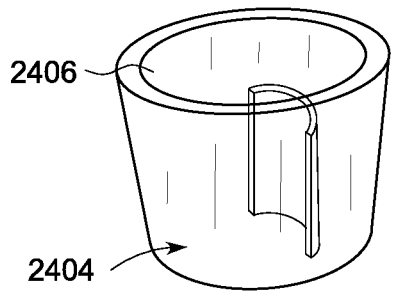
FIGS. 45-48 illustrate a still further exemplary embodiment where a cantilevered arm inside the cup is alternately received through a slot in the finger flange for shipment and into a complementary groove in the mouth of the tap for cup storage by the consumer.
Figure 46:
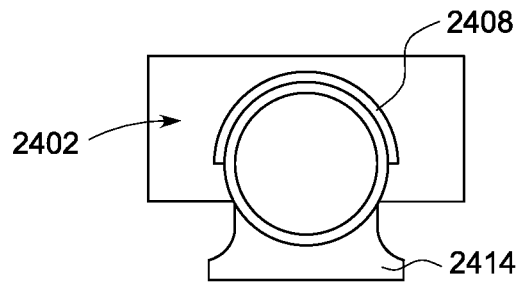
Figure 47:
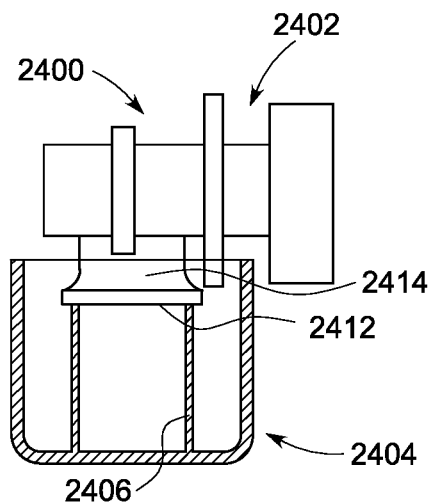
Figure 48:
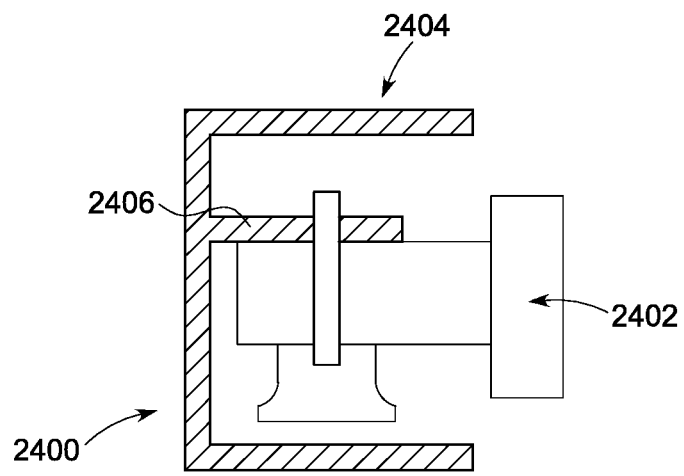

FIGS. 43-44 illustrate an exemplary embodiment 2300 including a tap 2302 and a cup/cap 2304 where a side wall 2306 of the cup 2304 includes a linear spline 2308 which is slidably receivable into a complementary spline groove 2310 on the outward face of the tap skirt 2312 for cup storage by the consumer after purchase.

FIGS. 45-48 illustrate a still further exemplary embodiment 2400 including a tap 2402 and a cap 2404 where a cantilevered arm 2406 (which may be curved) inside the cup 2304 is alternately received through a slot 2408 in the finger flange 2410 during shipment and received into a complementary groove 2412 within the mouth 1414 of the tap 2402 for cup storage by the consumer.

Figure 49:
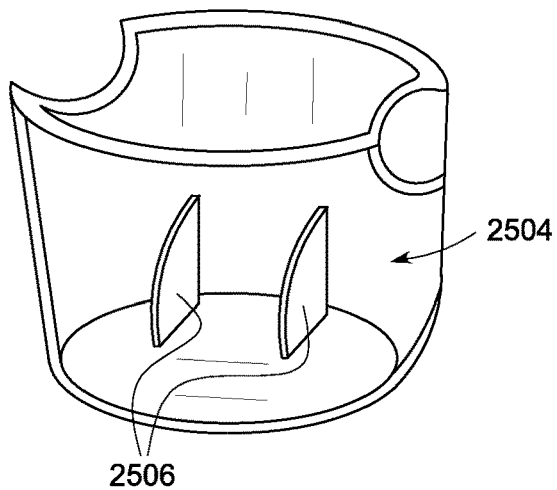
FIGS. 49-51 illustrate an exemplary embodiment where the cup including internal rib walls for shipment and the face of the tap skirt includes grooves for receiving the peripheral edge of the cup.
Figure 50:
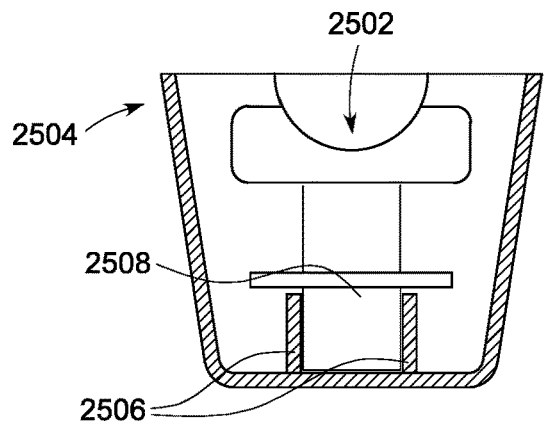
Figure 51:
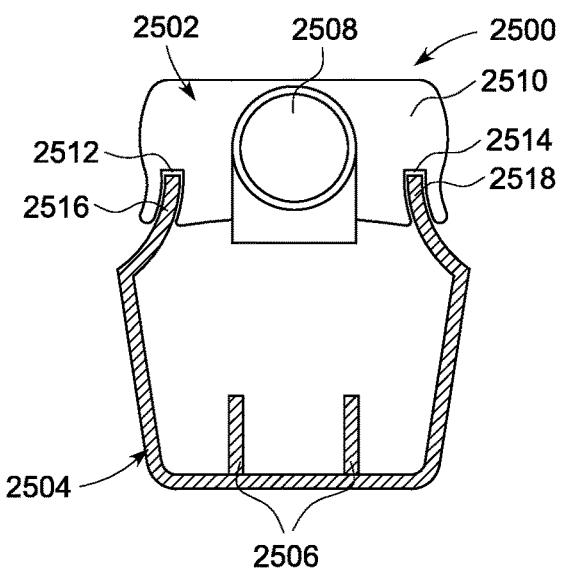

FIGS. 49-51 illustrate an exemplary embodiment 2500 including a tap 2502 and a cap 2504 where the cup 2504 includes spaced internal rib walls 2506 which engage the dispensing head 2508 for shipment and where the face of the tap body 2510 includes spaced opposing grooves 2512, 2514 for receiving inwardly contoured peripheral edges 2516, 2518 of the cup 2504.

Figure 52:
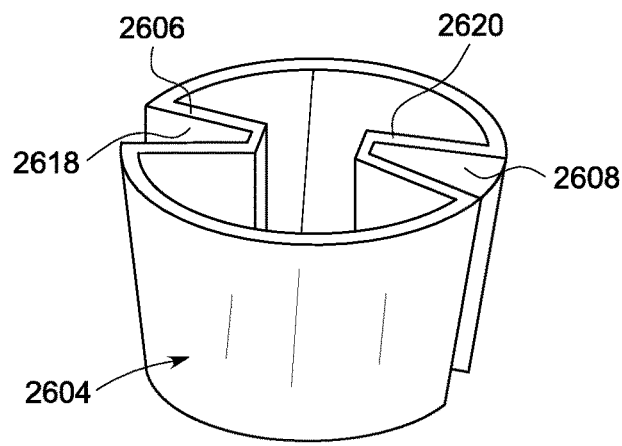
FIGS. 52-54 illustrate an exemplary embodiment wherein the cup includes opposing inwardly extending wall sections which surround the tap for shipment and wherein the tap dispensing head and skirt include tabs which are snap fit with slots in the wall sections.
Figure 53:
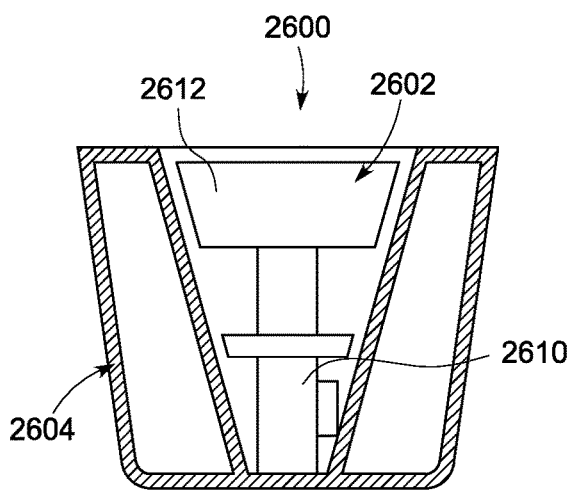
Figure 54:
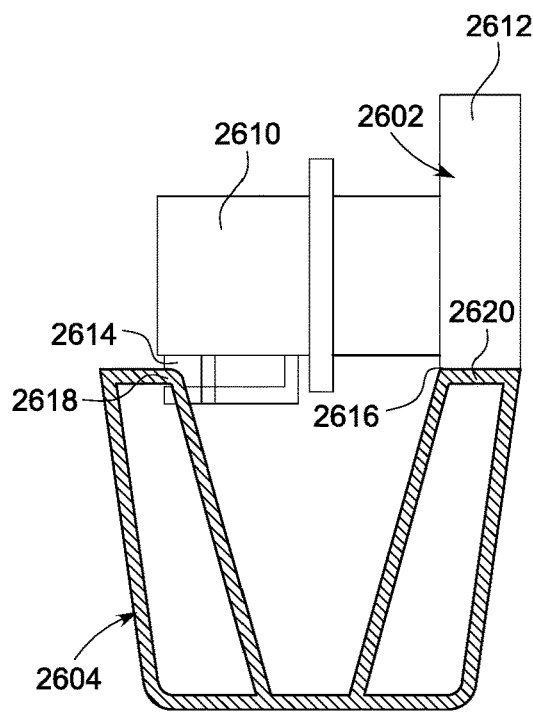

FIGS. 52-54 illustrate an exemplary embodiment 2600 including a tap 2602 and a cup 2604 wherein the cup 2604 includes opposing inwardly extending wall sections 2606, 2608 which surround the tap 2602 for shipment and wherein the tap dispensing head 2610 and skirt 2612 include tabs 2614, 2616 which are snap fit with slots 2618, 2620 in the wall sections 2606, 2608.

Figure 55:
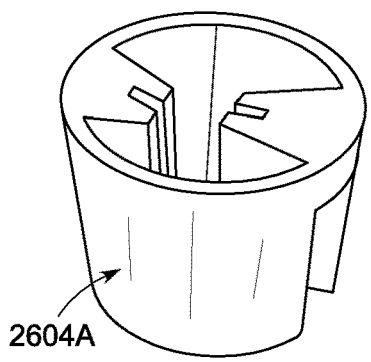
FIG. 55 illustrates an alternative version of the cup in the embodiment in FIGS. 52-54.

FIG. 55 illustrates an alternative version of the cup 2604A in the embodiment in FIGS. 52-54.

Figure 56:
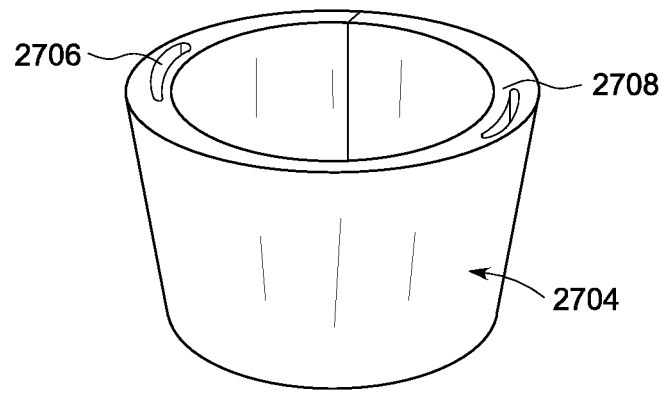
FIGS. 56-58 illustrate a still further exemplary embodiment where opposing peripheral edge portions of the cup include receiving slots and the front face of the tap skirt includes outwardly extending complementary tabs.
Figure 57:
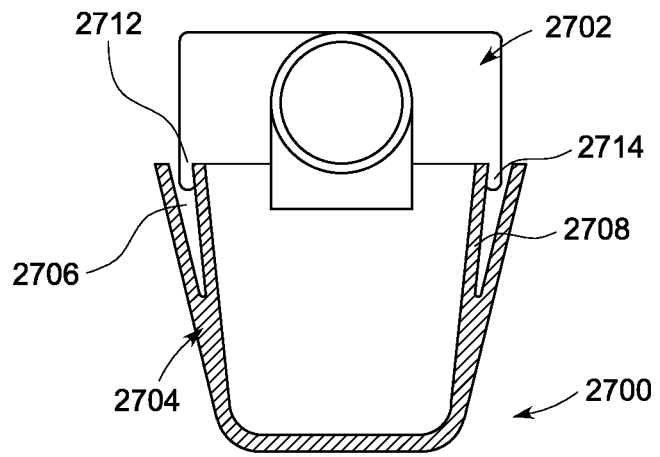
Figure 58:
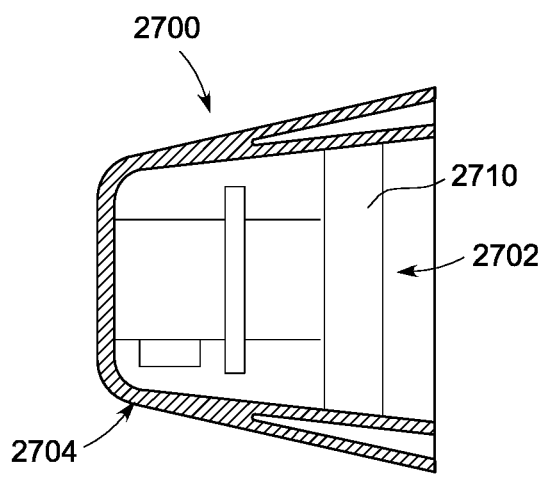

FIGS. 56-58 illustrate a still further exemplary embodiment 2700 including a tap 2702 and a cap 2704 where opposing peripheral edge portions of the cup include receiving slots 2706, 2708 and the front face of the tap skirt 2710 includes outwardly extending complementary tabs 2712, 2714.

Figures 59, 60:
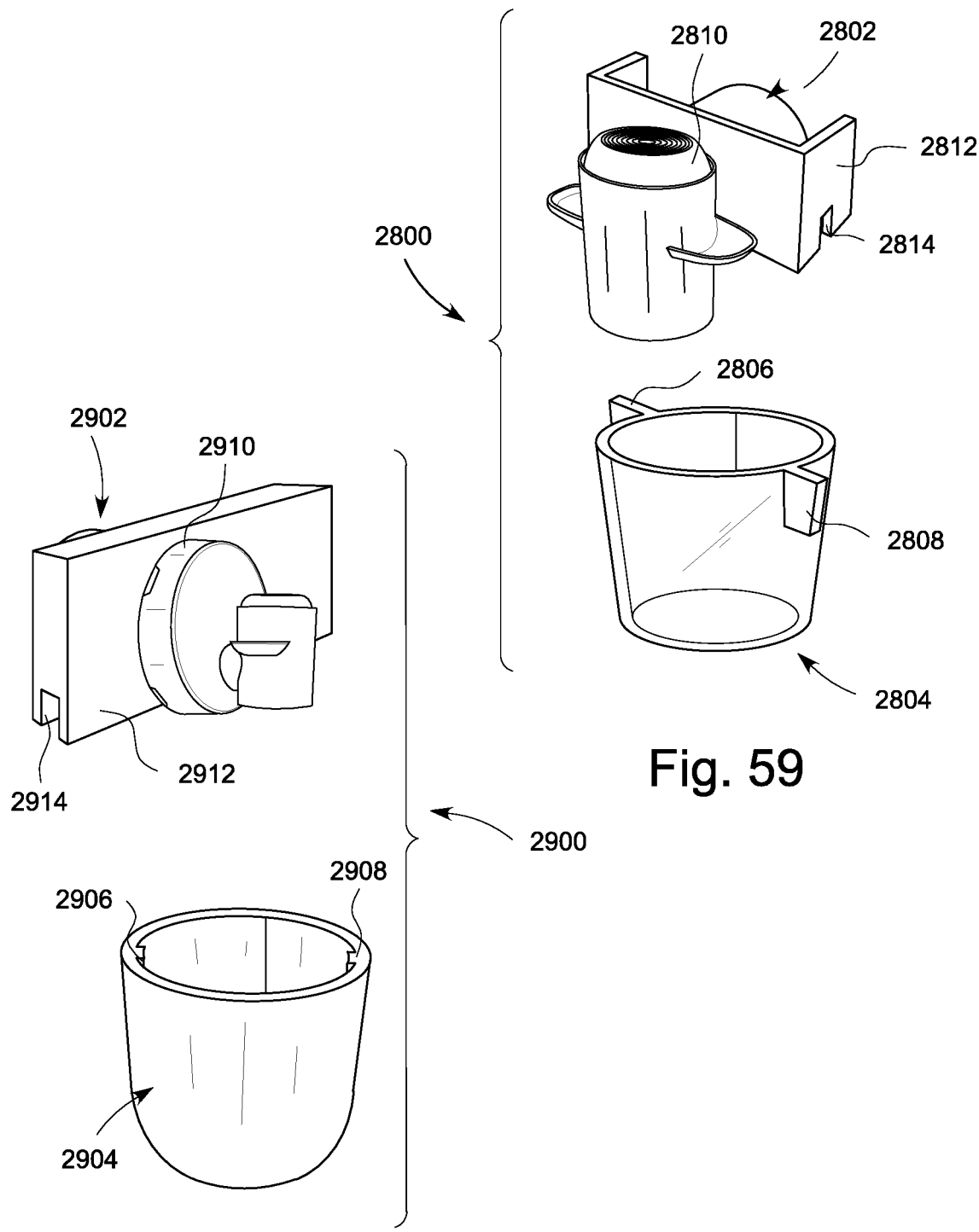
FIG. 59 illustrates an exemplary embodiment where the cup includes opposing outwardly radiating tabs and the skirt includes complementary slots.
FIG. 60 an exemplary embodiment where the cup includes opposing inwardly radiating tabs and the finger flange includes complementary slots.

FIG. 59 illustrates an exemplary embodiment 2800 including a tap 2802 and a cup 2804 where the cup 2804 includes opposing outwardly radiating tabs 2806, 2808 and the tap body 2810 includes a flange/wall structure 2812 with complementary slots 2814 (only one shown).

FIG. 60 an exemplary embodiment 2900 including a tap 2902 and a cap 2904 where the cup 2904 includes opposing inwardly radiating tabs 2906, 2908 and the tap body 2910 includes a finger flange 2912 that includes complementary slots 2914 (only one shown).

It can therefore be seen that the present disclosure provides for a novel dispensing system where a liquid dispensing tap and an associated measuring cup are assembled prior to installation onto a container. In use, the cup stays assembled with the tap during installation onto the container at the filling line, and it can be later removed and then reattached to the tap or container after an initial use by the consumer.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing system comprising:
a dispensing tap including
a body,
a dispensing head,
a throat connecting the body to the dispensing head and providing a flow path from the body to the dispensing head; and
a cup-shaped measuring cap having a bottom wall, side walls and an open top, the cap being received over the tap,
wherein the tap and the measuring cap include interfitting structures which secure the cap to the tap and allow the cap and tap to rotate together, and
wherein the cap includes a torquing structure for rotating of the cap and tap together as a combined unit.

2. The dispensing system of claim 1, wherein the tap body includes a skirt, and the skirt and the cap include said interfitting formations to secure the cap to the skirt.

3. The dispensing system of claim 1, wherein the tap includes finger holds or a finger flange and the cap includes ribs or walls which engage with the finger holds or finger flange.

4. The dispensing system of claim 1, wherein the torquing structure is an external surface of the cap.

5. The dispensing system of claim 1, wherein the torquing structure comprises a key structure in the outer surface of the cap.

6. The dispensing system of claim 5, wherein the torquing structure is a shaped structure selected from the group consisting of: hex, slot, key, detent or irregular shape.

7. The dispensing system of claim 3, wherein the finger holds or finger flange and the cap ribs or walls, include additional snap structures to improve retention.

8. The dispensing system of claim 1 wherein the cap includes a tamper evident band.

9. The dispensing system of claim 1 wherein the tap includes a raised ring and a peripheral edge of the cap is engaged within the ring.

10. The dispensing system of claim 1, wherein the cap and the tap body are threaded.

11. The dispensing system of claim 1, wherein the cap and tap are connected by a bayonette system.

* * * * *